United States Patent

Koaizawa et al.

[11] Patent Number: 5,897,682
[45] Date of Patent: Apr. 27, 1999

[54] APPARATUS FOR COOLING AN OPTICAL FIBER TO BE RESIN COATED

[75] Inventors: Hisashi Koaizawa; Tsuneo Suzuki, both of Ichihara, Japan

[73] Assignee: The Furukawa Electric Co., Ltd., Tokyo, Japan

[21] Appl. No.: 08/753,713

[22] Filed: Nov. 27, 1996

[30] Foreign Application Priority Data

Nov. 28, 1995 [JP] Japan .................................. 7-308833

[51] Int. Cl.⁶ .................................................. C03B 37/07
[52] U.S. Cl. .............................. 65/489; 65/484; 65/513; 65/532; 65/510
[58] Field of Search ............................. 65/379, 484, 479, 65/513, 532, 510, 434

[56] References Cited

U.S. PATENT DOCUMENTS

| | | | |
|---|---|---|---|
| 4,995,892 | 2/1991 | Garrett | 65/379 |
| 5,377,491 | 1/1995 | Schulte | 65/510 |
| 5,452,583 | 9/1995 | Schulte | 65/510 |

*Primary Examiner*—John Hoffmann
*Attorney, Agent, or Firm*—Pearne, Gordon, McCoy & Granger LLP

[57] ABSTRACT

A coated optical fiber is produced by the steps of cooling through a cooling assembly an optical fiber obtained by drawing, heating and spinning an optical fiber base material and thereafter coating the optical fiber with a resin wherein a gas mixture including an He gas and possible ambient air is sucked out of the cooling assembly and purified to collect the He gas to be a recovery gas of He which is to be recycled to the cooling assembly together with a pure He gas, but the gas mixture sucked out of the cooling assembly is compressed and stored until the gas mixture reaches a predetermined pressure or more and then purified when it reaches the predetermined pressure while the compressed gas mixture is returned to an upstream side of a compressor which serves to compress the gas mixture so that the flow quantity of gas suction varies in accordance with the flow of He gas supplied to the cooling assembly whereby the gas mixture from the cooling assembly is prevented from lowering an He gas concentration of the gas mixture.

12 Claims, 7 Drawing Sheets

APPARATUS FOR COOLING AN OPTICAL FIBER TO BE RESIN COATED

BACKGROUND OF THE INVENTION

This invention relates to an appatauus and a method for producing a coated optical fiber by obtaining an optical fiber by drawing, heating and spinning optical fiber base material and thereafter coating the optical fiber with a resin and more particularly to an apparatus and a method for producing a coated optical fiber adapted to cool the optical fiber before it is coated with the resin while cooling the optical fiber is so controlled that it is stably cooled down even though the line speed or drawing speed of the optical fiber varies.

The line speed or drawing speed of the optical fiber is required to increase in order to improve a productivity of the coated optical fiber and lower the production cost when it is produced. As the line speed of the optical fiber increases, the optical fiber is introduced into a coating device before it is cooled down to a predetermined temperature in the cooling assembly. Since a thickness of a resin coat around the optical fiber depends on the temperature of the optical fiber introduced into the coating device, the higher temperature of the optical fiber causes the optical fiber to have the resin coat of less than predetermined thickness. Thus, as the line speed of the optical fiber increases, a cooling capacity of the cooling assembly should be improved.

In general, an He gas of high cooling efficiency has been used as cooling medium to be supplied to the cooling assembly. The He gas is retrieved out of the cooling assembly and then exhausted to the atmosphere. Thus, the production cost will be disadvantageously higher because the consumption volume of the He gas increases as the line speed of the optical fiber increases.

In order to avoid such a drawback, there has been proposed an apparatus for producing a coated optical fiber of cooling gas circulation system wherein an He gas sucked out of a cooling assembly is purified and collected to be a recovery gas and recycled to the cooling assembly (see Japanese Laying-Open No. 240,129/1992 or 4-240,129, for example).

As shown in FIG. 7, this apparatus for producing the coated optical fiber comprises a drawing furnace in which an optical fiber base material 1 is drawn while being heated and spun to obtain an optical fiber 3, a cooling assembly 4 through which an He gas flows to cool the thus obtained optical fiber 3, a resin coating device 5 to form a resin coat around the optical fiber cooled down to the predetermined temperature, a curing means 6 to cure the resin coat around the optical fiber 3 and a winding means 9 to wind the coated optical fiber 7 introduced out of the curing means 6 through a guide roll 8.

The He gas is supplied through a gas inlet 4b provided in the cooling assembly 4 at its lower side and sucked out of a gas outlet 4a provided in the cooling assembly 4 at its upper side. The He gas is mixed with an ambient air possibly sucked into a fiber inlet 4c through which the optical fiber 3 is introduced into and also into a fiber outlet 4d through which the optical fiber 3 is taken out of the cooling assembly 4. The thus obtained gas mixture including the He gas and the possible ambient air is sucked out of the gas outlet 4b by a compressor described later.

A gas purifying and circulating means 10 is connected between the gas outlet 4a and the gas inlet 4b of the cooling assembly 4. The gas purifying and circulating means 10 comprises a gas purifier 12 to receive the gas mixture retrieved out of the gas outlet 4a of the cooling assembly 4 through a compressor 11 and separate the air out of the gas mixture to collect the He gas as a recovery gas of He and a gas mixer 14 to mix the recovery gas of He supplied from the gas purifier 12 with a pure He gas to form a supply gas. The gas mixer 14 is connected to the gas inlet 4b of the cooling assembly 4 so that the supply gas is supplied to the cooling assembly 4.

However, since the coated optical fiber production apparatus having such a gas purifying and circulating means 10 is provided with the compressor 11 for retrieving or sucking the gas mixture out. of the cooling assembly 4, if the line speed of the optical fiber 3 is relatively lower and therefore the flow of He gas supplied to the cooling assembly 4 is lower than a flow of the gas mixture sucked by the compressor 11, a purification efficiency of He gas is lowered for the reasons described hereinjustbelow.

The compressor 11 generally has a constant flow quantity of suction of gas. Therefore, as the drawing speed (line speed) of the optical fiber 3 is relatively lower and therefore the flow quantity of He gas supplied thereto is relatively lower, the cooling assembly 4 tends to have a negative pressure applied thereto because a flow quantity of the cooling gas through the cooling assembly 4 is less than the flow quantity of suction of gas by the compressor 11. This causes the He gas in the cooling assembly 4 to be sucked out of the gas outlet 4a of the cooling assembly 4 by the compressor 11 while possibly accompanied by an ambient air drawn through the fiber inlet 4c and the fiber outlet 4d in the cooling assembly 4. Accordingly,the He gas concentration of the gas mixture sucked out of the gas outlet 4a will be lowered so as to lower the cooling capacity and therefore the quantity of consumption of He gas will increase. Furthermore, the lowered He gas concentration of the gas mixture causes the purification efficiency (separation efficiency) of the gas purifier 12 to be disadvantageously lowered.

Therefore, the flow quantity of the gas mixture sucked by the compressor 11 is required to be adjusted to the line speed of the optical fiber 3, but since the adjustment of the flow quantity of suction cannot be accomplished unless the compressor changed, it will be understood that the flow quantity of suction cannot be practically adjusted.

In addition thereto, as aforementioned, the thickness of the resin coat around the optical fiber 3 is affected by the temperature of the optical fiber 3 passing through the cooling assembly 4 and sucked out of the fiber outlet 4d therein and the temperature of the optical fiber 3 is affected by the He gas concentration and a flow rate of a cooling gas supplied to the cooling assembly 4. Thus, unless the He gas concentration and the flow rate of the recovery gas of He obtained by being separated and purified from the gas mixture by the gas purifier 12 are measured, the flow rate of the recovery gas of He and the flow rate of the pure He gas supplied from a pure He gas supply 15 cannot be effectively controlled. As a result, the coat diameter of the resin coat around the optical fiber largely varies.

SUMMARY OF THE INVENTION

Accordingly it is a principal object of the invention to provide an apparatus for producing a coated optical fiber adapted to prevent an He gas concentration of a gas mixture sucked out of a cooling assembly from being lowered even though a line speed of an optical fiber is lowered and therefore to enable the He gas to be recovered at higher concentration from the gas mixture whereby a temperature of the optical fiber supplied to a resin coating device can be controlled in a predetermined manner and the coated optical fiber can be produced having a predetermined thickness.

It is another object of the invention to provide an apparatus for producing a coated optical fiber adapted to more easily and more accurately control a thickness of a resin coat to be formed around an optical fiber by accurately adjusting a mixture ratio of a pure He gas and a recovery gas of He purified from a gas mixture from a cooling assembly for cooling the optical fiber from a result of measuring a He gas concentration and a flow quantity of the recovery gas of He.

It is further object of the invention to provide an apparatus for producing a coated optical fiber adapted to supply in a stable manner a recovery gas of He obtained by being purified from a gas mixture sucked out of a cooling assembly.

It is further object of the invention to provide a method for producing a coated optical fiber adapted to prevent an He gas concentration of a gas mixture sucked out of a cooling assembly from being lowered even though a line speed of an optical fiber is lowered and therefore to enable a lot of He gas to be recovered at higher concentration from the gas mixture whereby a temperature of the optical fiber supplied to a resin coating device can be controlled in a predetermined manner and the coated optical fiber can be produced having a predetermined thickness.

FUNDAMENTAL CONSTRUCTION OF THE INVENTION

According to a fundamental construction of the invention, there is provided an apparatus for producing a coated optical fiber comprising a cooling assembly through which an He gas is discharged for cooling an optical fiber under process after drawing, heating and spinning; a resin coating means to coat a resin around said optical fiber cooled down to a predetermined temperature through said cooling assembly; a gas purifying and circulating means to retrieve a gas mixture including said He gas and possible ambient air in said cooling assembly and separate a recovery gas of He from said gas mixture for purification, thereby recycling said He gas; and a pure He gas supply means to supply a pure He gas to said cooling assembly, said gas purifying and circulating means comprising a compressor to compress said gas mixture retrieved from said cooling assembly; a suction control means to prevent said cooling assembly from resulting in an untolerable negative pressure applied thereto by controlling the flow of said gas mixture sucked in from said cooling assembly when said gas mixture is compressed; a gas purifier to separate and purify said He gas to be said recovery gas from said gas mixture compressed by said compressor and a recovery gas supply passage to supply said recovery gas from said gas purifier to said cooling assembly.

As the flow (or flow quantity) of suction of the gas mixture from the cooling assembly is controlled when the gas mixture is sucked out of the cooling assembly and compressed by the compressor, the He gas concentration of the gas mixture is prevented from being lowered even though a line speed of the optical fiber is relatively lower such as the line speed of the optical fiber rises when the optical fiber is heated and spun and accordingly even though a flow quantity of the He gas supplied to the cooling assembly is relatively lower whereby a purification or separation efficiency of the gas purifier is prevented from being lowered. This enables the He gas to be effectively recovered even though the line speed of the optical fiber is relatively lower when drawing the optical fiber begins to rise.

In addition thereto, as the flow quantity of suction of the gas mixture from the cooling assembly is controlled and properly maintained when the gas mixture including the He gas sucked out of the cooling assembly and compressed by the compressor, the ambient air is prevented from being largely drawn into the cooling assembly. Thus, the optical fiber tends to be prevented from vibrating due to the suction of the air, which prevents the optical fiber from being coated with a resin in an uneven manner.

More particularly, since a diameter of the fiber inlet through which the optical fiber enters the cooling assembly is relatively small, a flow rate of the air sucked through the fiber inlet in the cooling assembly becomes larger and the gas mixture sucked by the compressor from the cooling assembly is sucked out of the cooling assembly across a direction of movement of the optical fiber. Thus, as the air sucked into the cooling assembly by the compressor is sucked out of the cooling assembly together with the He gas, vibration is applied to the optical fiber in a direction normal to the movement thereof. The vibration of the optical fiber will become remarkably larger as the flow of suction and the flow rate of the air sucked into the cooling assembly becomes larger. Since the suction control means of the invention serves to control the flow quantity of the gas mixture sucked out of the cooling assembly in accordance with the flow quantity of He gas supplied to the cooling assembly and therefore serves to prevent the ambient air from being sucked in the cooling assembly, the vibration of the optical fiber can be effectively prevented.

Although the cooling gas used in the invention may be only He gas which has good cooling efficiency, less than a critical quantity of combustible $H_2$ may be added to the He gas and dilute gases such as $N_2$, Ar or the like may be added thereto. It should be noted that the gas purifier cannot recover other than the He gas and the $H_2$ gas.

There will be described hereinjustbelow some features of the invention which can accomplish the fundamental construction of the invention.

A FIRST FEATURE OF THE INVENTION

According to a first feature of the invention, there is provided an apparatus for producing a coated optical fiber comprising a cooling assembly in which an He gas is discharged for cooling an optical fiber under process after drawing, heating and spinning; a resin coating means to coat a resin around said optical fiber cooled down to a predetermined temperature through said cooling assembly; a gas purifying and circulating means to retrieve a gas mixture including said He gas and possible ambient air in said cooling assembly and separate a recovery gas of He from said gas mixture for purification, thereby recycling said He gas; and a pure He gas supply means to supply a pure He gas to said cooling assembly, said gas purifying and circulating means comprising a first reservoir to store said gas mixture retrieved from said cooling assembly; a compressor to compress said gas mixture supplied from said first reservoir; a second reservoir to store said gas mixture compressed by said compressor; a first gas return passage to return part of said compressed gas mixture within said second reservoir; a gas purifier to separate and purify said He gas to be said recovery gas from said compressed gas mixture supplied from said second reservoir and a recovery gas supply passage to supply said recovery gas from said gas purifier to said cooling assembly.

As part of the compressed gas mixture within the second reservoir is returned through the first gas return passage to the first reservoir upstream of the compressor, a suction force applied to the gas mixture within the cooling assembly upstream of the first reservoir is slackened while the compressor is sucking and compressing the gas mixture from the first reservoir so that a negative pressure is prevented from being applied to the cooling assembly. Thus, the quantity of the ambient air sucked into the cooling assembly through the fiber inlet or the fiber outlet is limited and therefore the He gas concentration of the gas mixture stored within the first reservoir is prevented from being lowered. The first and second reservoirs together with the first gas return passage provide the suction control means in this arrangement.

In this manner, since the He gas concentration of the gas mixture is prevented from being lowered even though a line speed of the optical fiber is relatively lower such as the line speed of the optical fiber rises when the optical fiber begins to be heated and spun and accordingly even though a flow quantity of the He gas supplied to the cooling assembly is relatively lower whereby a purification or separation efficiency of the gas purifier is not lowered. This enables the He gas to be effectively recovered even though the line speed of the optical fiber is relatively lower when the optical fiber begins to be drawn.

In addition thereto, as the ambient air is prevented from being sucked into the cooling assembly, the optical fiber tends to be prevented from vibrating due to the suction of the ambient air, which prevents the optical fiber from being coated with a resin in an uneven manner.

A PRESSURE OF A GAS MIXTURE SUPPLIED TO THE GAS PURIFIER

The gas purifying and circulating means may further comprise an He gas concentration annunciator to derive a He gas concentration (purity) of the recovery gas of He obtained by being separated from the gas mixture for purification by the gas purifier, a mass flow controller to control a flow rate of the recovery gas supplied to the cooling assembly and an pressure regulator to adjust a pressure of the gas mixture to be supplied to the gas purifier in accordance with the He gas concentration of the gas mixture derived by the He gas concentration annunciator In this manner, as the He gas concentration of the recovery gas is derived and the pressure of the gas mixture to be supplied to the gas purifier is adjusted in accordance with the measured He gas concentration, the gas purifier can be operated at higher separation efficiency.

FLOW CONTROL OF A DRAIN GAS FROM THE GAS PURIFIER

The gas purifying and circulating means may further comprise an He gas concentration annunciator to derive a He gas concentration of the recovery gas of He obtained by being separated and purified from the gas mixture by the gas purifier and a drain gas flow controller to control in accordance with the He gas concentration derived by the He gas concentration annunciator a flow of a drain gas which is the rest of the gas mixture from which the He gas is separated by the gas purifier.

In this manner, as the drain gas from the gas purifier is exhausted in accordance with the He gas concentration derived by the He gas concentration annunciator, the He gas concentration of the recovery gas of He can be so controlled that it has a predetermined concentration. The predetermined He gas concentration can be set as a value determined in accordance with the line speed of the optical fiber. This may be also done in accordance with a time lapsing after an operation begins as well as the line speed of the optical fiber.

STORAGE OF THE RECOVERY GAS OF He

The gas purifying and circulating means may further comprise a plurality of recovery gas storage reservoirs provided downstream of the gas purifier to store the recovery gas of He.

These recovery gas storage reservoirs are adapted to sequentially supply the recovery gas of He through the recovery gas supply passage from one which terminates to fully store it. This causes the recovery gas to be supplied in a stable manner.

A recovery gas compressor may be provided between the recovery gas storage reservoirs and the gas purifier. This enables the recovery gas of He to be stored while it is compressed. Therefore, the recovery gas storage reservoirs may be compacted and more quantity of recovery gas can be stored by the compacted reservoirs.

A SECOND FEATURE OF THE INVENTION

According to a second feature of the invention, there is provided an apparatus for producing a coated optical fiber comprising a cooling assembly in which an He gas is discharged for cooling an optical fiber under process after drawing, heating and spinning; a resin coating means to coat a resin around said optical fiber cooled down to a predetermined temperature through said cooling assembly; a gas purifying and circulating means to retrieve a gas mixture including said He gas and possible ambient air in said cooling assembly and separate an He gas as a recovery gas of He from said gas mixture for purification, thereby recycling said He gas; and a pure He gas supply means to supply a pure He gas to said cooling assembly; by said gas purifying and circulating means comprising a first reservoir to store said gas mixture retrieved from said cooling assembly; a compressor to compress said gas mixture supplied from said first reservoir; a second reservoir to store said gas mixture compressed by said compressor; a first gas return passage to return part of said compressed gas mixture within said second reservoir; a gas purifier to separate and purify said He gas to be said recovery gas of He from said compressed gas mixture supplied from said second reservoir; a third reservoir to store said recovery gas obtained by being purified and recovered by said gas purifier; a second gas return passage to return said recovery gas to said first reservoir; an He gas concentration annunciator to derive an He gas concentration of said recovery gas and a recovery gas supply passage to supply said recovery gas stored by said third reservoir to said cooling assembly.

The apparatus for producing the coated optical fiber constructed in accordance with the second feature of the invention can prevent the He gas concentration of the gas mixture stored by the first reservoir from being lowered and as a result the purification (separation) efficiency of the gas purifier and also the optical fiber tends not to vibrate within the cooling assembly even though a line speed of the optical fiber is relatively lower and accordingly even though a flow of He gas supplied to the cooling assembly is relatively lower whereby the optical fiber is prevented from being coated with the resin in an uneven manner.

In addition thereto, as all the recovery gas of He is so controlled as to be returned to the first reservoir through the second gas return passage while the He gas concentration of the recovery gas of He derived by the He gas concentration annunciator is lower, the He gas concentration of the gas mixture on the input side of the gas purifier become higher. Therefore, the purification efficiency (or separation efficiency) of the gas purifier can be more improved and as a result the recovery gas of high He gas concentration can be circulated to the cooling tower.

A PRESSURE OF A GAS MIXTURE SUPPLIED TO THE GAS PURIFIER

The gas purifying and circulating means may further comprise a pressure regulator to adjust a pressure of the gas mixture to be supplied to the gas purifier in accordance with the He gas concentration of the gas mixture derived by the He gas concentration annunciator.

In this manner, as the pressure of the gas mixture to be supplied to the gas purifier is adjusted in accordance with the He gas concentration derived by the gas concentration annunciator, the gas purifier can be operated at higher separation efficiency.

FLOW CONTROL OF A DRAIN GAS FROM THE GAS PURIFIER

The gas purifying and circulating means may further comprise a drain gas flow controller to control in accordance with the He gas concentration derived by the He gas concentration annunciator a flow rate of a drain gas of the gas mixture from which the He gas is separated by the gas purifier.

In this manner, as the drain gas to be exhausted from the gas purifier is exhausted in accordance with the He gas concentration derived by the He gas concentration annunciator, the He gas concentration of the recovery gas of He can be so controlled that it has a predetermined concentration. The predetermined He gas concentration can be set as a value determined in accordance with the line speed of the optical fiber. This may be also done in accordance with a time lapsing after an operation begins as well as the line speed of the optical fiber.

A THIRD FEATURE OF THE INVENTION

According to a third feature of the invention, there is provided an apparatus for producing a coated optical fiber comprising a cooling assembly in which an He gas is discharged for cooling an optical fiber under process after drawing, heating and spinning; a resin coating means to coat a resin around said optical fiber cooled down to a predetermined temperature through said cooling assembly; a gas purifying and circulating means to retrieve a gas mixture including said He gas and possible ambient air in said cooling assembly and separate a recovery gas of He from said gas mixture for purification, thereby recycling said He gas and a pure gas supply means to supply a pure He gas to said cooling assembly, said gas purifying and circulating means comprising a first reservoir to store said gas mixture retrieved from said cooling assembly; a compressor of variable suction flow type to compress said gas mixture supplied from said first reservoir; a control to control an operation of said compressor of variable suction flow type so that said gas mixture is sucked in proportion to a flow rate of said He gas supplied to said cooling assembly; a second reservoir to store said gas mixture compressed by said compressor; a gas purifier to separate and concentrate said He gas as said recovery gas of He from said compressed gas mixture supplied from said second reservoir and a recovery gas supply passage to supply said recovery gas from said gas purifier to said cooling assembly.

The apparatus for producing the coated optical fiber constructed in accordance with the third feature of the invention has nothing corresponding to the gas return passage used in the apparatus constructed in accordance with the first feature of the invention, but since the operation of the compressor of variable suction flow type is so conrtolled that the gas mixture within the cooling assembly is sucked out of the cooling assembly in proportion to the flow rate of the He gas supplied to the cooling assembly, the cooling assembly is subject to a suction force corresponding to the flow quantity of He gas supplied even when a line speed of the optical fiber is lower such as it rises or the like whereby the cooling assembly is prevented from having a negative pressure applied thereto. Thus, a He gas concentration of the gas mixture stored by the first reservoir is never lowered even though the apparatus has no gas return passage to return the compressed gas mixture from the second reservoir to the first reservoir as in the apparatus constructed in accordance with the first feature of the invention. The first and second reservoirs together with the variable suction compressor provide the suction control means in this arrangement.

As a result, the purification efficiency (separation efficiency) of the gas purifier is never lowered and also the optical fiber has no tendency to vibrate within the cooling assembly even though a line speed of the optical fiber is relatively lower and accordingly even though a flow quantity of lie gas supplied to the cooling assembly is relatively lower whereby the optical fiber is prevented from being coated with the resin in an uneven manner. Therefore, the He gas can be more effectively recovered even while the line speed of the optical fiber varies from the low speed thereof to the target speed thereof when drawing rises.

In the same manner as the first and second features of the invention, the He gas concentration of the recovery gas of He can be derived and the pressure of the gas mixture supplied to the gas purifier can be adjusted in accordance with the derived He gas concentration so that it can be operated with higher separation efficiency. Although not shown, a flow rate of a drain gas from the gas purifier may be so adjusted in accordance with a He gas concentration of the recovery gas derived by a He gas concentration annunciator that the He gas concentration of the recovery gas is controlled to the predetermined value. Furthermore, although not shown, a plurality of recovery gas storage reservoirs to store the recovery gas of He may be provided downstream of the gas purifier.

A FOURTH FEATURE OF THE INVENTION

According to a fourth feature of the invention, there is provided a method for producing a coated optical fiber comprising the steps of passing through a cooling assembly an optical fiber under process after drawing, heating and spinning and cooling said optical fiber down to a predetermined temperature by an He gas which is discharged in said cooling assembly; thereafter producing said coated optical fiber by coating said cooled optical fiber with a resin; retrieving a gas mixture including said He gas and possible ambient air in said cooling assembly out of said cooling assembly; separating and purifying said He gas as a recovery gas out of said gas mixture to feed back said said recovery gas and supplying a pure He gas to said cooling assembly for adjustment, further including the steps of storing in a first reservoir said gas mixture retrieved from said cooling assembly; compressing said gas mixture supplied from said first reservoir by a compressor; storing said gas mixture compressed by said compressor in a second reservoir; returning part of said compressed gas mixture through a gas return passage to said first reservoir; supplying said gas mixture to a gas purifier when said compressed gas mixture reaches a predetermined pressure and separating and purifying said He gas to be said recovery gas out of said gas mixture; supplying said recovery gas of He to said cooling assembly after said recovery gas reaches a predetermined He gas concentration and controlling a blend ratio of said recovery gas of He and said pure He gas so that a resin coat of said coated optical fiber has a constant thickness.

As the part of the compressed gas mixture within the second reservoir is returned through the gas return passage to the first reservoir upstream of the compressor, a suction force applied to the gas mixture within the cooling assembly upstream of the first reservoir is slackened while the compressor is sucking and compressing the gas mixture from the first reservoir. Thus, the ambient air is prevented from being sucked into the cooling assembly through the fiber inlet or the fiber outlet and therefore the He gas concentration of the gas mixture stored within the first reservoir is prevented from being lowered.

In this manner, since the He gas concentration of the gas mixture is prevented from being lowered even though a line speed of the optical fiber varies from a low speed to a high speed such as it rises when the optical fiber is heated and spun and accordingly even though a flow of He gas supplied to the cooling assembly is relatively lower whereby a purification or separation efficiency of the gas purifier is not lowered. This enables the He gas to be effectively recovered even though the line speed of the optical fiber is relatively lower, which tends to occur when the the optical fiber rises on drawing.

In addition thereto, since the first, reservoir is disposed between the cooling assembly and the compressor, the ambient air is prevented from being sucked into the cooling assembly due to the negative pressure generated by the compressor. Therefore, the optical fiber has no tendency to vibrate due to the suction of the ambient air, which prevents the optical fiber from being coated with a resin in an uneven manner.

As the ambient air is prevented from being sucked into the gas mixture to be supplied to the first reservoir as aforementioned, the He gas concentration of the gas mixture supplied to the gas purifier is restrained from being lowered. This enables the recovery efficiency of the He gas and the He gas concentration of the recovery gas of He to be more improved.

Furthermore, since the gas mixture is stored in the second reservoir until the pressure of the gas mixture in the second reservoir reaches the predetermined pressure required to effectively operate the gas purifier and the gas mixture begins to be supplied to the gas purifier and to be purified by the gas purifier after the second reservoir reaches the predetermined pressure, the purification (separation) efficiency of the gas purifier can be more improved even though the line speed of the optical fiber varies form a low speed to a high speed which tends to occur when it rises.

Since the recovery gas of He separated and recovered by the gas purifier is supplied or recycled to the cooling assembly after the He gas concentration of the recovery gas exceeds the minimum tolerance value, the He gas concentration of the cooling gas supplied to the cooling assembly as the recovery gas of He and the pure He gas are supplied can be effectively prevented from being lowered.

If it is when the second reservoir reaches the predetermined pressure at which the gas mixture is supplied to the gas purifier that the compressed gas mixture is returned from the second reservoir to the first reservoir, controlling the compressed gas mixture to be returned to the first reservoir and controlling the compressed gas mixture to be supplied to the gas purifier can be advantageously made in a simultaneous manner.

BRIEF DESCRIPTION OF THE DRAWING

The above and other objects and features of the invention will be apparent from the description of the embodiments of the invention taken along with the accompanying drawings in which.

DETAILED DESCRIPTION OF EMBODIMENTS OF THE INVENTION
(CONSTRUCTION OF A FIRST EMBODIMENT)

Figure 1:
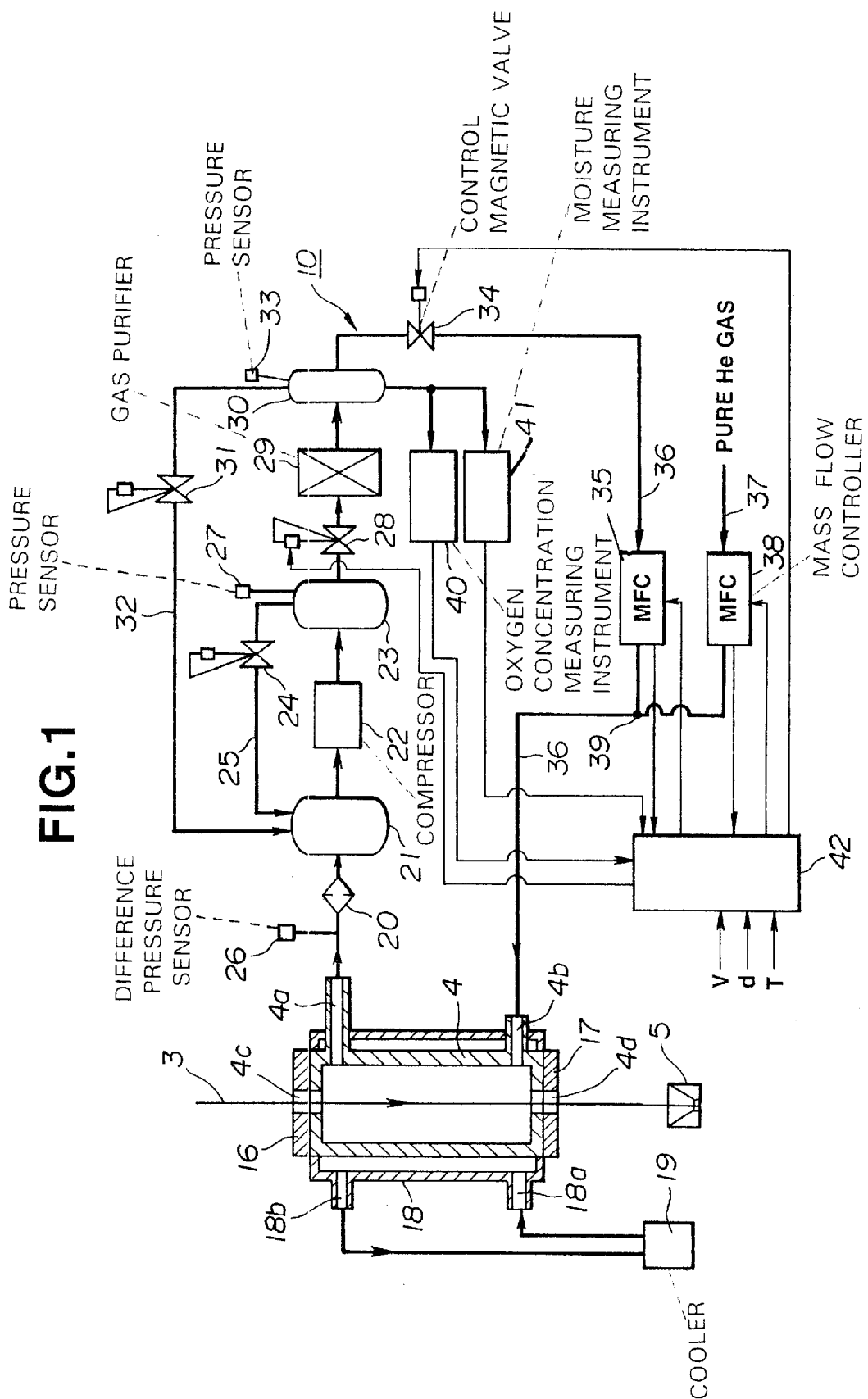
FIG. 1 is a schematic diagram of an He gas purifying and circulating means of an apparatus for producing a coated optical fiber constructed in accordance with a first embodiment of the invention.

Referring now to FIG. 1, there are shown a cooling assembly 4 and an He gas purifying and circulating means 10 of an apparatus for producing a coated optical fiber constructed in accordance with a first embodiment of the invention. In the same manner as the prior art of FIG. 7, the cooling assembly 4 on its upstream side is connected to the drawing furnace 2 and on its downstream side is connected to the resin coating means 5.

A fiber inlet 4c of the cooling assembly 4 may be closed by an upper shutter 16 while a fiber outlet 4d of the cooling assembly 4 may be closed by a tower shutter 17. A cooling jacket 18 may be provided around the cooling assembly 4. A cooling medium from a cooler 19 may be supplied through a lower cooling agent inlet 18a and may be recovered through an upper cooling agent outlet 18b to be returned to the cooler 19. Heat insulating material not shown may be provided around the cooling jacket 18.

An He gas purifying and circulating means 10 comprises a first reservoir 21 to store an He gas sucked out of a gas outlet 4a of the cooling assembly 4 by a compressor described later together with an ambient air through a filter 20, a compressor 22 to compress a gas mixture including the He gas and the ambient air from the first reservoir 21 and a second reservoir 23 to store the gas mixture compressed by the compressor 22.

The air sucked out of the cooling assembly 4 together with the He gas is one sucked into the cooling assembly 4 through the fiber inlet 4c and the fiber outlet 4d thereof. The He gas and the air will be referred to as the gas mixture hereinjustlater. As aforementioned, the cooling gas may include an additional gas such as $H_2$ gas or a dilute gas of $N_2$, Ar or the like in addition to the He gas. In this case, the gas mixture sucked out of the cooling assembly 4 includes the He gas, the additional gas and the air drawn in through the fiber inlet 4c and fiber outlet 4d of the cooling assembly 4.

A first gas return passage 25 is provided between the second reservoir 23 and the first reservoir 21 through a pressure regulator 24 and serves to return the compressed gas mixture in the second reservoir 23.

The pressure regulator 24 serves to adjust a flow of the compressed gas mixture returned from the second reservoirs 23 to the first reservoir 21. The pressure regulator 24 adjusts the pressure of the compressed gas mixture to be returned to the first reservoir 21 in accordance with a pressure detected by a pressure sensor (or difference pressure sensor) 26 which serves to detect the pressure on the side of the gas outlet 4a of the cooling assembly 4. A pressure sensor 27 is provided on the second reservoir 23 to detect the pressure within the second reservoir 23. The pressure sensor 27 may be used for returning the excessive compressed gas mixture to the first reservoir 21 so that the inner pressure of the second reservoir 23 is made constant.

A gas purifier 29 may be of separating membrane type, for example and serves to separate and recover the He gas as a recovery gas out of the compressed gas mixture supplied to the second reservoir 23 through a pressure regulator 28 which is adapted to be controlled in accordance with an instruction from a control means 42 which will be described later. The He gas (recovery gas) separated and recovered by the gas purifier 29 is stored in a third reservoir 30.

A second gas return passage 32 is provided between the third reservoirs 30 and the first reservoir 21 through a pressure regulator 31. The second gas return passage 32 serves to return the recovery gas within the third reservoir 30 to the first reservoir 21. The pressure regulator 31 is so operated as to adjust the pressure of the recovery gas in accordance with an instruction from the control means 42 based on the pressure detected by a pressure sensor 33 which serves to detect the inner pressure of the third reservoir 30.

The recovery gas within the third reservoir 30 is supplied to the gas inlet 4b of the cooling assembly 4 through a recovery gas supply passage 36 including a control magnetic valve 34 and a mass flow controller (referred to as MFC hereinbelow) 35.

A pure He gas supply passage 37 is connected through a MFC 38 to the portion of the recovery gas supply passage 36 downstream of the MFC 35 and also to a pure He gas supply not shown. The pure He gas supply passage 37 serves to replenish the He gas short for the cooling assembly 4. Thus, the recovery gas of He and the pure He gas are blended with each other and supplied to the gas inlet 4b of the cooling assembly 4.

The MFCs 35 and 38 measure the flow rate of the gas flowing therethrough and the result of measurement is supplied to the control means 42 which will be described later. Since the flow rate of the He gas supplied to the cooling assembly 4 is determined in accordance with the line speed of the optical fiber 3, the control means 42 serves to control the flow rates (flow ratio) of the recovery gas of He and the pure He gas based on the result of measurement of the flow rates of the MFCs 35 and 38.

To the third reservoir 30 is connected an He gas concentration measuring means (an He gas concentration annunciator) which comprises an oxygen concentration measuring instrument 40 and a moisture measuring instrument 41 connected in parallel to each other and connected to the control means 42. The oxygen concentration measuring instrument 40 measures an oxygen concentration of the recovery gas of He while the moisture measuring instrument 41 measures a quantity of moisture of the recovery gas. Detected outputs from the oxygen concentration measuring instrument 40 and the moisture measuring instrument 41 are input to the control means 42. The control means 42 serves to estimate the He gas concentration of the recovery gas of He in accordance with the measured oxygen concentration of the recovery gas of He. Since the recovery gas of He includes only air other than the He gas, the He gas concentration of the recovery gas can be estimated by the oxygen concentration of the recovery gas of He. The control means 42 may control a refrigerator not shown to remove a moisture out of the recovery gas of He in accordance with the quantity of moisture (ambient moisture mixed together with the ambient air) measured by the moisture measuring instrument 40.

To the control means 42 are input a line speed signal $\underline{V}$ of the optical fiber 3, a coat diameter signal $\underline{d}$, a temperature signal $\underline{T}$ of the optical fiber 3 before it enters the coating means 5 (see FIG. 7) and other signals. The control means 42 determines the flow rates of the recovery gas of He and the pure He gas while it controls the MFCs 35 and 38 in accordance with the input signals $\underline{V}$, $\underline{d}$ and $\underline{T}$.

Also, the control means 42 supplies a control signal to control the pressure applied to the gas purifier 29 in accordance with the He gas concentration of the recovery gas of He which is estimated by the output of the oxygen concentration measuring instrument 40. Furthermore, the control means 42 supplies an instruction signal used to begin to supply the recovery gas to the control magnetic valve 34.

(OPERATION OF THE FIRST EMBODIMENT)

Next, the operation of the He gas purifying and circulating means 10 will be described hereinjustbelow. As the line speed of the optical fiber 3 gradually rises after it begins to be produced, the coat diameter of the coated optical fiber 7 becomes smaller. When the coat diameter of the coated optical fiber 7 reaches a predetermined value, the pure He gas is supplied to the gas inlet 4b of the cooling assembly 4 through the pure He gas supply passage 37. The flow rate of the pure He gas supplied is controlled in accordance with the coat diameter of the coated optical fiber 7 and the line speed of the optical fiber 3.

After the optical fiber 3 begins to be cooled within the cooling assembly 4 in which the pure He gas is discharged, the compressor 22 begins to be operated so that the He gas within the cooling assembly 4 is sucked out of the gas outlet 4a through the filter 20 and the first reservoir 21 together with the ambient air drawn into the cooling assembly 4 and stored within the second reservoir 23. The mixed He gas and air will be referred to as a gas mixture hereinbelow.

On starting of the apparatus, since the flow rate of the sucked gas mixture is more than the flow rate of the pure He gas supplied to the cooling assembly 4, the pressure regulator 28 is adjusted to such a predetermined pressure as the compressed gas mixture is never supplied to the gas purifier 29. The compressor 22 continues to be operated until the second reservoir 23 reaches the predetermined pressure of the pressure regulator 28. The predetermined pressure may be 9 kg/cm² of gauge pressure, for example.

The pressure of the second reservoir 23 is detected by the pressure sensor 27, the output of which is input to the control means 42. The control means 42 serves to return the compressed gas mixture from the second reservoir 23 through the first gas return passage 25 to the first reservoir 21. The flow quantity of the compressed gas mixture returned to the first reservoir 21 is so determined that a total of the flow quantity of the compressed gas mixture returned and the flow quantity of the pure He gas supplied to the cooling assembly 4 corresponds to the flow quantity of gas sucked by the compressor 22. In this manner, since a degree of negative pressure within the cooling assembly 4 is restrained because the flow quantity of the gas mixture sucked out of the cooling assembly 4 is smaller even though the flow quantity of the pure He gas supplied to the cooling assembly 4 is relatively smaller, the He gas concentration of the gas mixture sucked by the compressor 22 is never lowered At the same time when the compressed gas mixture is returned from the second reservoir 23 to the first reservoir 21, the compressed gas mixture starts to be also supplied from the second reservoir 23 to the gas purifier 29. The gas purifier 29 serves to separate and recover the He gas as the recovery gas of He out of the compressed gas mixture by a separating membrane therefor. The thus obtained recovery gas of He is stored within the third reservoir 30 and a drain gas other than the recovery gas of He is withdrawn to the atmosphere and discarded.

The control means 42 estimates the He gas concentration of the recovery gas of He based on the oxygen concentration measured by the oxygen concentration measuring instrument 40. Also, the control means 42 supplies a control signal to the pressure regulator 28 to control the pressure to be applied to the gas purifier 29 based on the He gas concentration of the recovery gas of He.

The gas purifier 29 of separating membrane type has no function to separate the He gas unless the pressure of the compressed gas mixture supplied from the second reservoir 23 reaches the predetermined value, but it will be understood that the pressure of the compressed gas mixture varies on the He gas concentration of the gas mixture and therefore the pressure to be applied to the gas purifier 29 should be controlled based on the He gas concentration of the recovery gas of He supplied to the cooling assembly 4.

The control magnetic valve 34 is so controlled as to be kept closed so that the recovery gas of He is never supplied to the recovery gas supply passage 36 unless the He gas concentration of the recovery gas of He reaches the minimum tolerance value, which varies on the line speed of the optical fiber 3. Meanwhile, the recovery gas of He is returned from the third reservoir 30 through the second gas return passage 32 to the first reservoir 21 and blended with the gas mixture sucked out of the cooling assembly 4. The gas mixture together with the thus returned recovery gas of He is purified in the same manner as aforementioned. As the recovery gas of He is returned to the first reservoir 21, the He gas concentration of the gas mixture to be compressed by the compressor 22 becomes higher and therefore the separation efficiency of the gas purifier 29 is more improved.

After the He gas concentration of the recovery gas of He exceeds the minimum tolerance value, the control means 42 supplies the supply starting instruction signal to the control magnetic valve 34, which is in turn opened in accordance with the instruction signal so that the recovery gas of He within the third reservoir 30 is supplied through the MFC 35 to the cooling assembly 4 while the pure He gas is also supplied together with the recovery gas through the MFC 38 and the gas inlet 4a to the cooling assembly 4.

The blend ratio of the recovery gas of He and the pure He gas supplied to the cooling assembly 4 is so set that the recovery gas of He is as much as passible while the pure He gas is supplied so as to replenish the shortage of the cooling gas. Of course, the flow quantity of the blended gas supplied to the cooling assembly 4 varies on the line speed of the optical fiber 3.

In this manner, the coated optical fiber 7 begins to be produced while the coat diameter of the coated optical fiber 7 is kept constant by controlling the flow rate of the He gas supplied to the cooling assembly 4. After the line speed of the optical fiber 3 becomes constant, the blended gas is controlled so as to be supplied to the cooling assembly 4 while it has the He gas concentration and the flow quantity corresponding to the line speed of the optical fiber 3.

Reversely, the pure He gas may be supplied to the cooling assembly 4 so as to have a flow quantity proportional to the predetermined line speed of the optical fiber 3 while the recovery gas of He may be supplied so as to replenish the shortage of the cooling gas. The flow quantity of the pure He gas may be advantageously so set as to be lower in order to control the consumption of the He gas.

(ADVANTAGES OF THE FIRST EMBODIMENT)

It will be noted that, in the apparatus of FIG. 1, the first gas return passage 25 between the second reservoir 23 and the first reservoir 21 and the second gas return passage 32 between the third reservoir 30 and the first reservoir 21 serve to suck a proper flow quantity of gas mixture out of the cooling assembly 4 and therefore to prevent the cooling assembly 4 as much as possible from having a negative pressure applied thereto on the operation of the compressor 22.

Therefore, the He gas concentration of the gas mixture sucked by the compressor 22 is prevented from being lowered and as a result the separation efficiency of the gas purifier 29 is never lowered. This enables the He gas concentration of the recovery gas to be restrained from being lowered and therefore the He gas to be recovered from the gas mixture while it has higher recovery efficiency or higher He gas concentration even though the line speed of the optical fiber 3 is relatively lower and the flow quantity of the He gas supplied is smaller such as the coated optical fiber 7 starts to be produced.

Also, as the negative pressure applied to the cooling assembly 4 is restrained and the ambient air is prevented from being introduced into the cooling assembly 4 through the fiber inlet 4c and the fiber outlet 4d thereof, the vibration of the optical fiber 3 which tends to occurs when the ambient air is drawn into the cooling assembly 4 can be more effectively prevented.

The He gas concentration of the recovery gas is estimated by measuring the oxygen concentration of the recovery gas of He by the oxygen concentration measuring instrument 40 and the pressure of the pressure regulator 28 is adjusted in accordance with the estimated He gas concentration. The control means 42 receives the result of the measurement of the He gas concentration of the recovery gas of He to control the flow rates of the MFCs 35 and 38 in accordance with the line speed of the optical fiber 3, the temperature thereof and the coat diameter of the coated optical fiber 7. Thus, the blended gas can be controlled to be supplied to the cooling assembly 4 so as to have the optimum He gas concentration and the flow rate of He gas in accordance with the line speed of the optical fiber 3, the temperature thereof and the coat diameter of the coated optical fiber 7. This enables the coat diameter of the coated optical fiber 7 to be controlled with higher accuracy.

(GAS RECOVERY CHARACTERISTIC)

Figure 7:
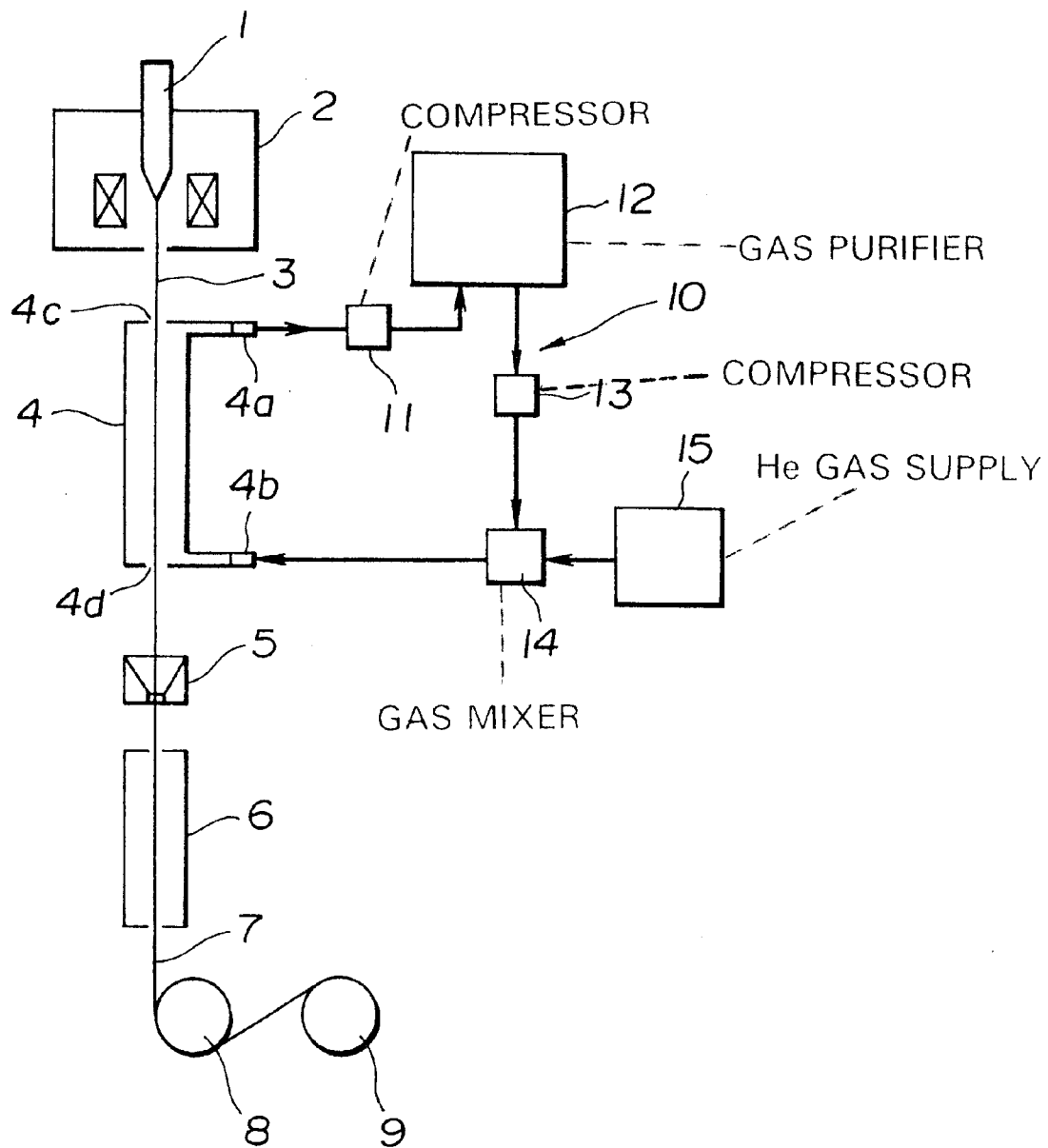
FIG. 7 is a schematic diagram of an apparatus for producing a coated optical fiber constructed in accordance with a prior art.

In the apparatuses of FIGS. 1 and 7, both of the compressors 11 and 22 had the capacity of 6 $m^3/h$ and the results of comparison of the recovery efficiencies of the He gas recovered from the gas mixture from the cooling assembly 4 of the apparatuses of FIGS. 1 and 7 are shown in the following Table I. In this Table I, the term "recovery efficiency" means the ratio (%) of the recovery gas of He relative to the gas mixture sucked by the compressors 11 and 22. The He gas concentration on of the recovery gas of He was 50%.

TABLE I

| FLOW RATE OF GAS SUPPLIED TO COOLING ASSEMBLY (l/minute) | RECOVERY RATE OF APPARATUS OF FIG. 7 (%) | RECOVERY RATE OF APPARATUS OF FIG. 1 (%) |
|---|---|---|
| 20 | 20 and less than | about 50 |
| 50 | 40–60 | 60–70 |
| 80 | 60–70 | 60–70 |

It will be noted from the Table I that the apparatus of the invention has a remarkably improved recovery rate in comparison with that of the apparatus of the prior art.

The He gas concentration of the recovery gas of both of the gas purifying and circulating means of FIGS. 1 and 7 increases because the flow rate of the cooling gas increases as the time lapses after the coated optical fiber begins to be produced. the Table II indicates the maximum He gas concentration (%) of the recovery gas.

TABLE II

| FLOW RATE OF GAS SUPPLIED TO COOLING ASSEMBLY (l/minute) | MAXIMUM He GAS PURITY OF APPARATUS OF FIG. 7 (%) | MAXIMUM He GAS PURITY OF APPARATUS OF FIG. 1 (%) |
|---|---|---|
| 20 | 50 and less than | about 80 |
| 50 | 50–60 | about 90 |
| 80 | 70 | about 95 |

It will be noted from the Table II that the apparatus of the invention has a remarkably improved maximum He gas concentration of the recovery gas in comparison with that of the apparatus of the prior art.

(CONSTRUCTION OF A SECOND EMBODIMENT)

Figure 2:
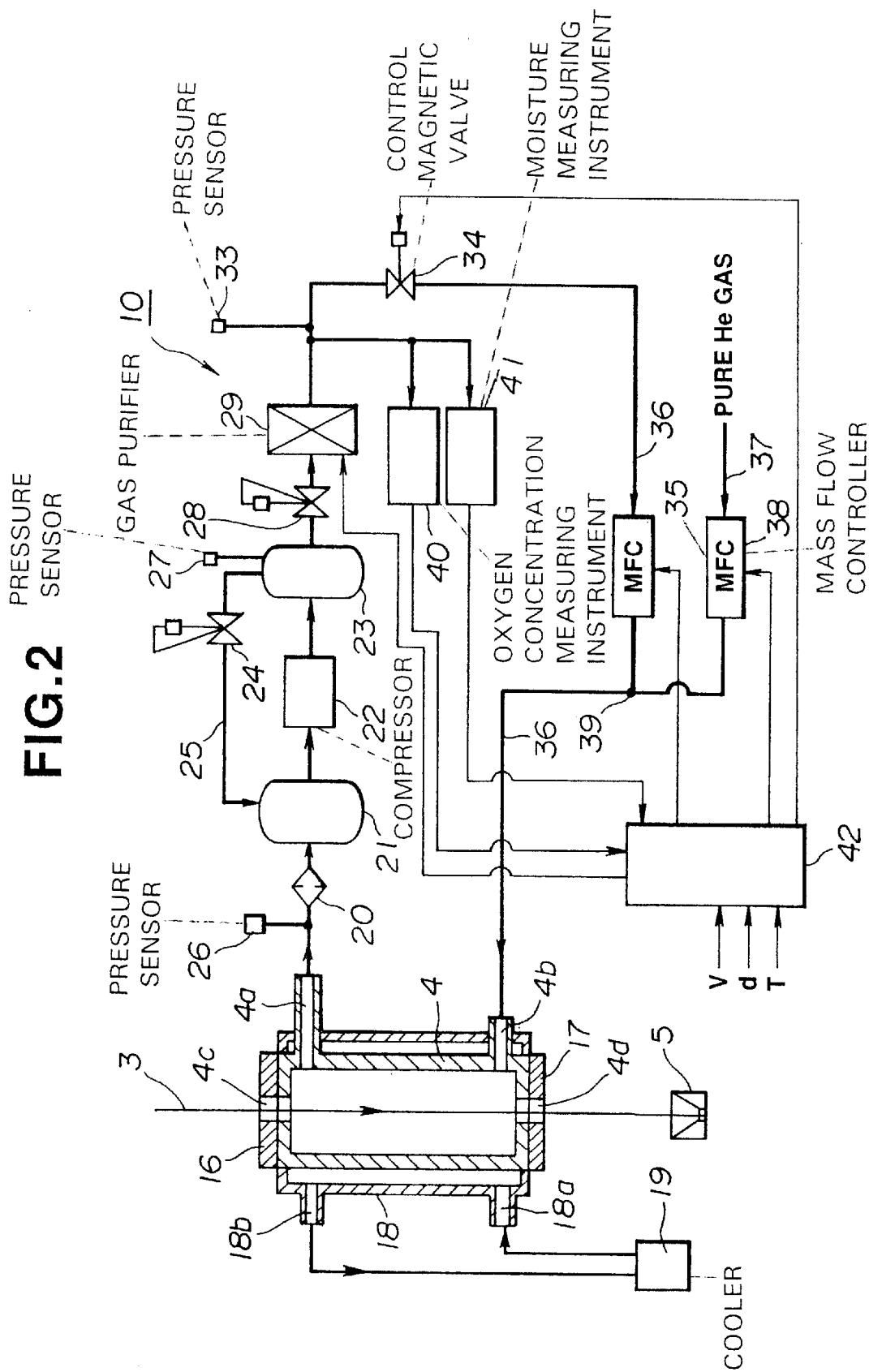
FIG. 2 is a schematic diagram of an He gas purifying and circulating means of an apparatus for producing a coated optical fiber constructed in accordance with a second embodiment of the invention.

Referring now to FIG. 2, there are shown a cooling assembly 4 and an He gas purifying and circulating means 10 of an apparatus for producing a coated optical fiber constructed in accordance with a second embodiment of the invention. In the same manner as the prior art of FIG. 7, the cooling assembly 4 on its upstream side is connected to the drawing furnace 2 and on its downstream side is connected to the resin coating means 5.

The He gas purifying and circulating means 10 constructed in accordance with the second embodiment is substantially identical to the He gas purifying and circulating means 10 of the first embodiment except that the third reservoir 30 and the second gas return passage 32 of the first embodiment are omitted. Therefore, only the construction different from that of the first embodiment will be described hereinjustbelow.

Figure 3:
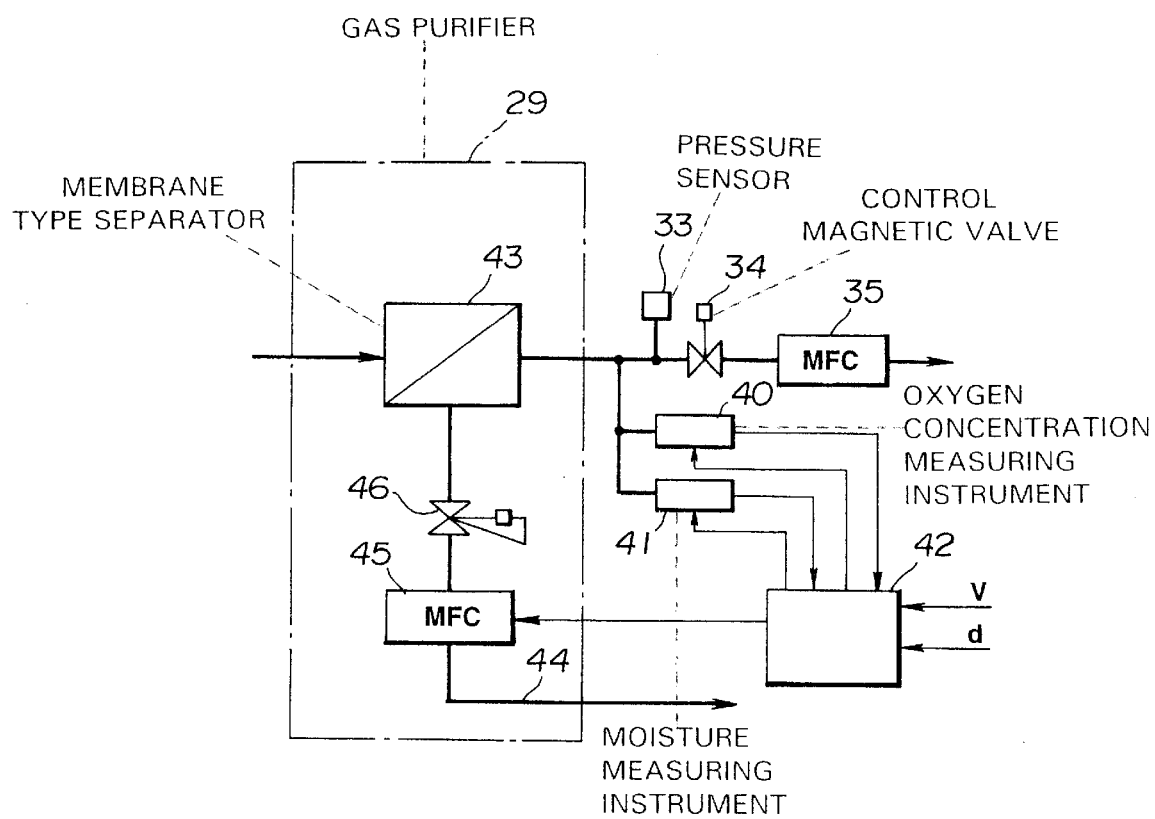
FIG. 3 is a schematic diagram of an internal construction of a gas purifier used for the gas purifying and circulating means of FIG. 2.

A gas purifier 29 used for the gas purifying and circulating means 10 constructed in accordance with the second embodiment is shown in FIG. 3. The gas purifier 29 may comprise a separating membrane type separator 43 to which the second reservoir 23 is connected through the pressure regulator 28 (see FIG. 2), a drain gas exhaust passage 44 to exhaust a drain gas, which is the rest gas of the gas mixture from which the He gas is separated and recovered and a pressure regulator 46 and a MFC 45 provided on the drain gas exhaust passage 44. The MFC 45 serves to control the flow quantity of the drain gas exhausted in accordance with a control instruction from the control means 42.

(OPERATION OF THE SECOND EMBODIMENT)

In operation of the apparatus constructed in accordance with the second embodiment, the optical fiber 3 is cooled while controlled in the same manner as that of the first embodiment when the coated optical fiber 7 starts to be produced and the line speed of the optical fiber 3 rises except for the items described hereinjustbelow.

The flow quantity of the drain gas exhausted through the drain gas exhaust passage 44 is so controlled by the MFC 45 that the recovery gas of He separated and recovered by the separating membrane type separator 43 has the predetermined He gas concentration. The predetermined He gas concentration has a predetermined value determined in accordance with the line speed of the optical fiber 3. The predetermined value of the He gas concentration is set in accordance with the line speed of the optical fiber and the time lapsing after the operation begins to be made. It will be noted that the separating membrane type separator 43 can control the He gas concentration of the recovery gas of He and the recovery quantity thereof by changing the pressure between the front (inlet) side and the rear (outlet) side of the membrane and therefore the He gas concentration of the recovery gas of He and the recovery quantity thereof is controlled by adjusting the flow rate of the drain gas exhaust passage 44 on the rear (outlet) side of the membrane.

More definitely, the exhaust flow rate of the drain gas exhaust passage 44 for the separating membrane type separator 43 and the flow quantity of compressed gas mixture returned from the second reservoir 23 to the first reservoir 21 were so controlled that the He gas concentration of the recovery gas of He was 30% through 50% when the line speed of the optical fiber 3 was of 500 m/minute and less than, the He gas concentration of the recovery gas of He was 60% through 70% when the line speed of the optical fiber 3 was of 500 through 700 m/minute and the He gas concentration of the recovery gas of He was 80% and more than when the line speed of the optical fiber 3 was 700 m/minute and more than. The He gas concentration of the recovery gas of He may be controlled by adjusting the exhaust pressure instead of the exhaust flow rate of the drain gas.

(ADVANTAGES OF THE SECOND EMBODIMENT)

Although the He gas purifying and circulating means 10 constructed in accordance with the second embodiment has more flow quantity of He gas exhausted than the gas purifying and circulating means 10 of the first embodiment, it will be noted that the apparatus has simpler construction because the third reservoir 30 and the second gas return passage 32 of the first embodiment can be omitted.

In the same manner as the apparatus of the first embodiment, the apparatus of the second embodiment can effectively recover and circulate the He gas even though the line speed of the optical fiber 3 is relatively lower and therefore the flow quantity of the cooling gas used is relatively lower, but it can be advantageously kept constant the He gas concentration of the recovery gas circulated through the cooling assembly 4 within the predetermined range of the line speed of the optical fiber 3 because the He gas concentration of the recovery gas can be controlled by regulating the flow quantity of exhaust of the drain gas through the MFC 45. This eases the flow rate of the pure He gas to be blended with the recovery gas of He to be estimated and enables the coat diameter of the coated optical fiber 7 to be prevented from varying.

(GAS RECOVERY CHARACTERISTIC)

In the apparatuses of FIGS. 2 and 7, both of the compressors 11 and 22 had the capacity of 6 $m^3$/h and the results of comparison of the recovery efficiencies of the He gas recovered from the gas mixture from the cooling assembly 4 of the apparatuses of FIGS. 2 and 7 are shown in the following Table III. In this Table III, the term "recovery efficiency" has the same meaning as that of the Table I and the He gas concentration of the recovery gas of He was 50%.

TABLE III

| FLOW RATE OF GAS SUPPLIED TO COOLING ASSEMBLY (l/minute) | RECOVERY RATE OF APPARATUS OF FIG. 7 (%) | RECOVERY RATE OF APPARATUS OF FIG. 2 (%) |
|---|---|---|
| 20 | 20 and less than | about 42 |
| 50 | 40–60 | 50–60 |
| 80 | 60–70 | 60–70 |

It will be noted from the Table III that the apparatus of the invention has a remarkably improved recovery rate in comparison with that of the apparatus of the prior art.

The He gas concentration of the recovery gas of He of both of the gas purifying and circulating means of FIGS. 2 and 7 increases because the flow rate of the cooling gas increases as the time lapses after the coated optical fiber 7 starts to be produced. The Table IV indicates the maximum He gas concentration (%) of the recovery gas of He.

TABLE IV

| FLOW RATE OF GAS SUPPLIED TO COOLING TOWER (l/minute) | MAXIMUM He GAS PURITY OF APPARATUS OF FIG. 7 (%) | MAXIMUM He GAS PURITY OF APPARATUS OF FIG. 2 (%) |
|---|---|---|
| 20 | 50 and less than | about 90 |
| 50 | 50–60 | about 95 |
| 80 | 70 | about 98 |

It will be noted from the Table IV that the apparatus of the invention has a remarkably improved maximum He gas concentration of the recovery gas in comparison with that of the apparatus of the prior art.

(CONSTRUCTION OF A THIRD EMBODIMENT)

Figure 4:
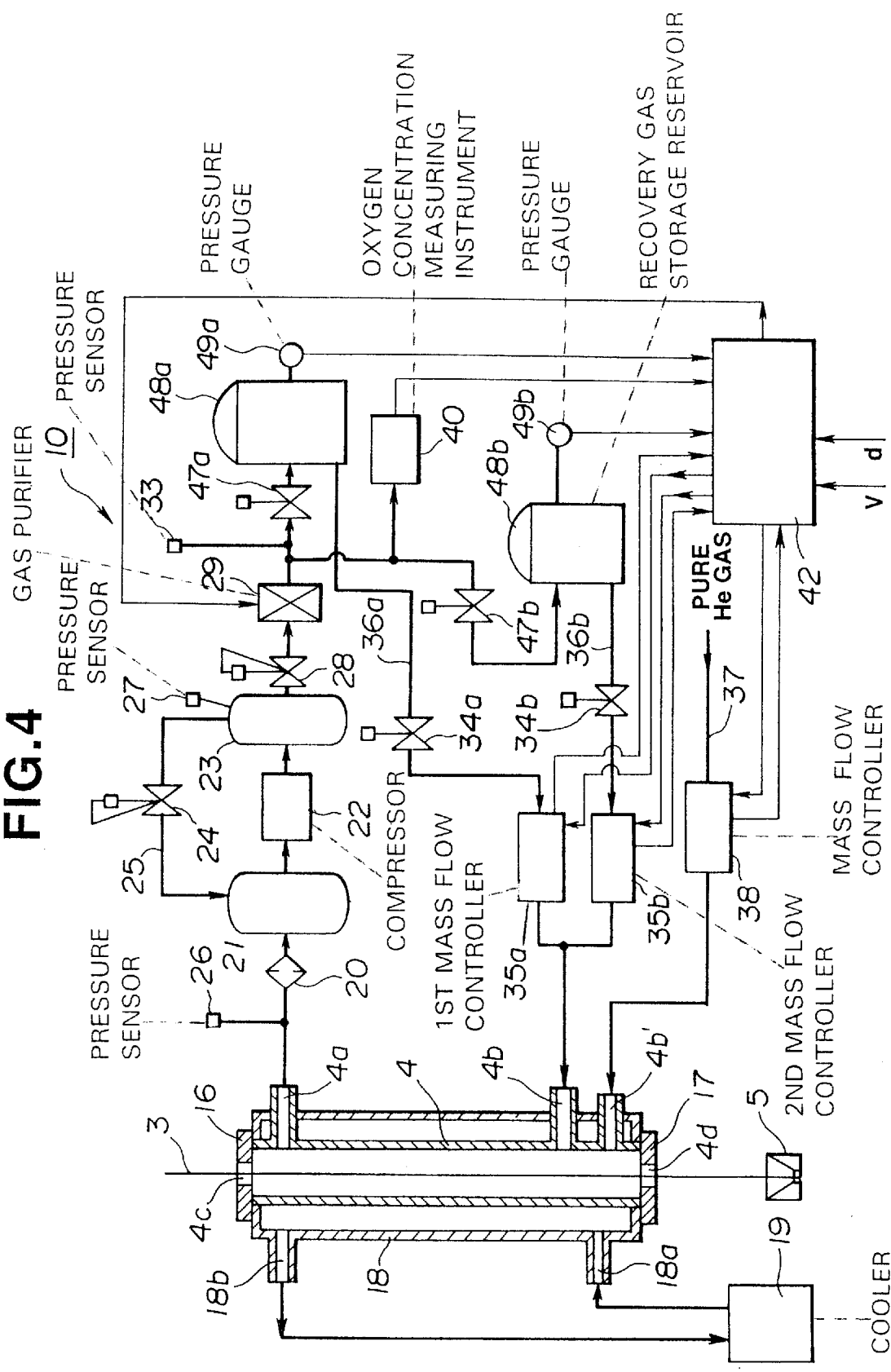
FIG. 4 is a schematic diagram of an He gas purifying and circulating means of an apparatus for producing a coated optical fiber constructed in accordance with a third embodiment of the invention.

Referring now to FIG. 4, there are shown a cooling assembly 4 and an He gas purifying and circulating means 10 of an apparatus for producing a coated optical fiber constructed in accordance with a third embodiment of the invention. In the same manner as the prior art of FIG. 7, the cooling assembly 4 on its upstream side is connected to the drawing furnace 2 and on its downstream side is connected to the resin coating means 5.

The He gas purifying and circulating means 10 constructed in accordance with the third embodiment is constructed by further expanding the construction of the second embodiment. The cooling assembly 4 may have two gas inlets 4b and 4b' provided on the lower side thereof. The gas inlet 4b may be one to which the recovery gas is supplied while the gas inlet 4b' may be one to which the pure He gas is supplied. Although, in the illustrated embodiment, the gas inlets 4b and 4b' are disposed on upper and lower sides of the cooling assembly 4, respectively, it will be understood that they may be reversely disposed on lower and upper sides thereof, respectively.

The gas purifier 29 may have the construction substantially identical to that of FIG. 3. The He gas purifying and circulating means 10 of the third embodiment is substantially identical to that of the second embodiment except that a plurality of recovery gas storage reservoirs are provided downstream of the gas purifier 29 and accompany some necessary components.

More particularly, first and second recovery gas storage reservoirs 48a and 48b to by turns store the recovery gas of He through first and second storage control magnetic valves 47a and 47b, respectively, are connected in parallel to the gas purifier 29 on its downstream side.

On the first and second recovery gas storage reservoirs 48a and 48b are provided respective first and second pressure gauges 49a and 49b, which are in turn connected to the control means 42 so that pressure signals from the respective pressure gauges 49a and 49b are input to the control means 42.

The first and second recovery gas storage reservoirs 48a and 48b are connected through first and second recovery gas supply passages 36a and 36b to the gas inlet 4b of the cooling assembly 4. When the first and second recovery gas storage reservoirs 48a and 48b terminates to store the recovery gas of He, the recovery gas of He is supplied from the first or second recovery gas storage reservoir 48a or 48b through the first or second recovery supply passage 36a or 36b to the cooling assembly 4.

First and second supply control magnetic valves 34a and 34b and first and second MFCs 35a and 35b are provided on the first and second recovery gas supply passages 36a and 36b, respectively. The control means 42 supplies flow rate control signals to the first and second MFCs 35a and 35b, respectively.

The pure He gas supply passage 37 having the MFC 38 provided thereon may be connected to the gas inlet 4b' of the cooling assembly 4 and the pure He gas is supplied through the gas supply passage 37 in to the cooling assembly 4.

(OPERATION OF THE THIRD EMBODIMENT)

In operation of the apparatus constructed in accordance with the third embodiment, the gas purifier 29 separates and recovers the He gas from the compressed gas mixture in the same manner as in the operation of the apparatus of the second embodiment.

The recovery gas separated and recovered by the gas purifier 29 is by turns stored by the first and second recovery gas storage reservoirs 48a and 48b through the first and second storage control magnetic valves 47a and 47b which are alternately opened in accordance with the instruction from the control means 42. For example, in case the first recovery gas storage reservoir 48a fully stores the recovery gas of He, the control means 42 instructs the first storage control magnetic valve 47a to be closed and the second storage control magnetic valve 47b to be opened and therefore the recovery gas is stored by the second recovery gas storage reservoir 48b.

Meanwhile, the first recovery gas storage reservoir 48a which has the recovery gas fully stored supplies the recovery gas of He to the gas inlet 4b of the cooling assembly 4 through the first recovery gas supply passage 36a having the first supply control magnetic valve 34a now opened in accordance with the instruction signal from the control means 42. Meantime, the recovery gas of He is stored by the second recovery gas storage reservoir 48b until it has the recovery gas fully stored.

The flow rate of the recovery gas of He is controlled by the MFC 35a through the instruction from the control means 42 set in accordance with the line speed of the optical fiber 3 or the predetermined coat diameter of the coated optical fiber so that the coat diameter of the coated optical fiber 7 has a constant value. The predetermined coat daimeter corresponds to one of the constant value.

As the pressure detection signal indicating that the gas pressure within the first recovery gas storage reservoir 48a to which the recovery gas is supplied is less than the predetermined value is supplied from the the first pressure gauge 49a to the control means 42, the control means 42 now controls the first supply control magnetic valve 34a to be closed and the second supply control magnetic valve 34b to be opened. Accordingly, the recovery gas of He is now supplied from the second recovery gas storage reservoir 48b through the second recovery gas supply passage 36b to the gas inlet 4b of the cooling assembly 4. Meantime, the recovery gas of He is stored by the first recovery gas storage reservoir 48a from the gas purifier 29 through the now opened storage control magnetic valve 47a until it has the recovery gas of He fully stored.

The flow rate of the recovery gas of He is also controlled by the second MFC 35b through the instruction from the control means 42 set in accordance with the line speed of the optical fiber 3 or the predetermined coat diameter so that the coat diameter of the coated optical fiber 7 has a constant value.

In this manner, the recovery gas of He is alternately supplied from the first and second recovery gas storage reservoirs 48a and 48b to the cooling assembly 4 and the operation is repeated so that the recovery gas of He is continuously supplied to the cooling assembly 4.

(ADVANTAGES OF THE THIRD EMBODIMENT)

One of advantages of the apparatus constructed in accordance with the third embodiment is that the cooling assembly 4 is never adversely affected by the variation in the pressure of the compressor 22 because the recovery gas of He is supplied to the cooling assembly 4 after it is once stored by the recovery gas storage reservoirs 48a and 48b.

Another advantage is that the recovery gas of He having a stable pressure can be recycled or supplied to the cooling assembly 4 because the recovery gas of He is supplied from one of the recovery gas storage reservoirs 48a and 48b which has the recovery gas fully stored and when the gas pressure within the supplying recovery gas storage reservoir 48a or 48b becomes lower than the predetermined value, the recovery gas of He is switched to be supplied from another recovery gas storage reservoir 48b or 48a. As aforementioned, since the flow rate of the recovery gas of He is controlled by the MFCs 35a and 35b and also the recovery gas is switched to be supplied from one of the recovery gas storage reservoirs to another recovery gas storage reservoir, the recovery gas of He can be more stably supplied to the cooling assembly 4. This accomplishes the same effects as obtained when only the He gas is supplied to the cooling assembly 4.

(ACCURACY OF COAT DIAMETER OF THE COATED OPTICAL FIBER)

In case the optical fiber 3 passes through the cooling assembly 4 at the line speed of 1000 m/minute, the coat diameter of the coated optical fiber 7 produced by the prior art apparatus varies within a range of ±3 $\mu$mm while the coat diameter of the coated optical fiber 7 produced by the apparatus of FIG. 4 varies within a range of ±2 $\mu$mm. It will be noted from this that the apparatus of FIG. 4 can more effectively prevent the coat diameter of the coated optical fiber from varying than that of the prior art.

(CONSTRUCTION OF THE FOURTH EMBODIMENT)

Figure 5:
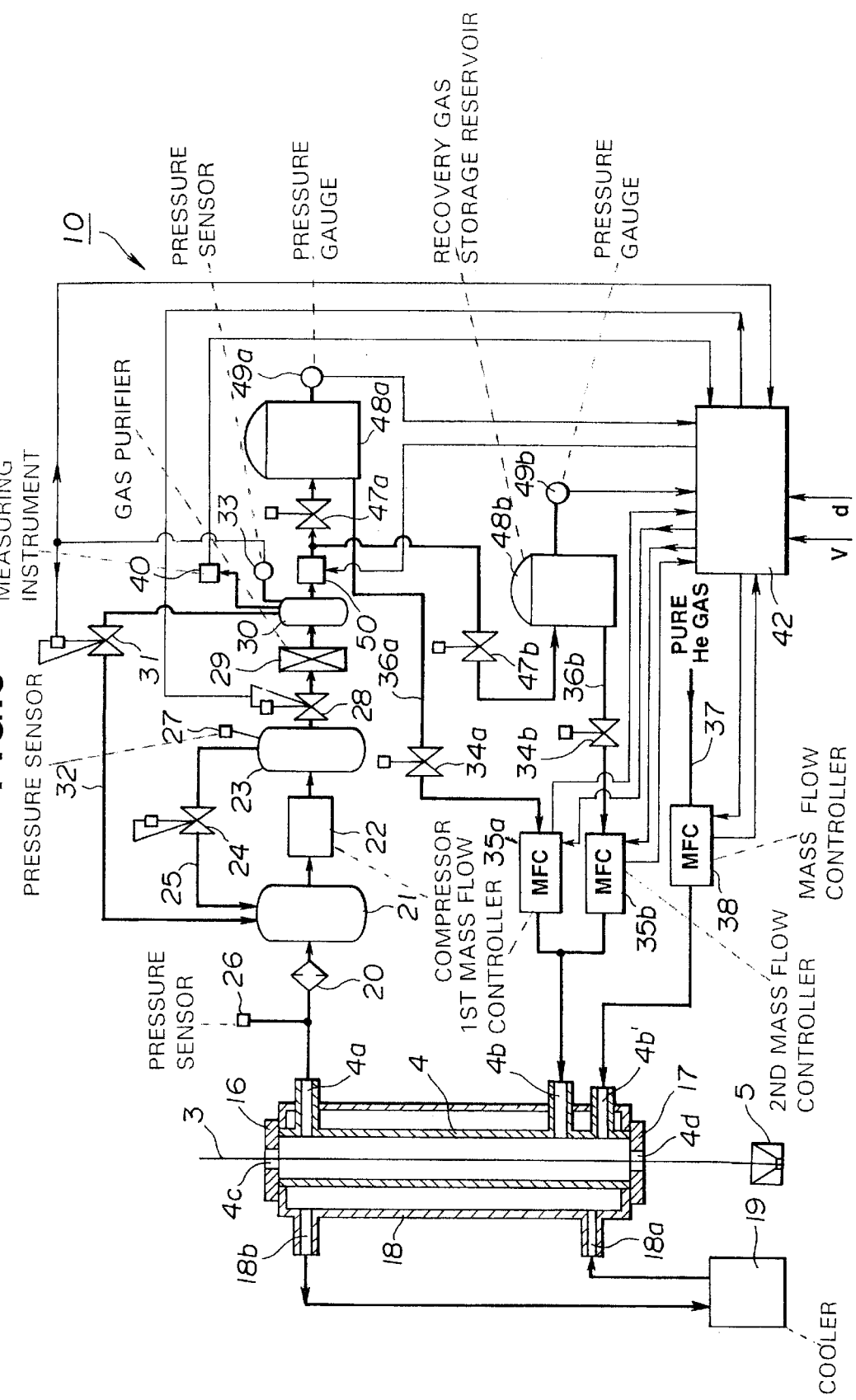
FIG. 5 is a schematic diagram of an He gas purifying and circulating means of an apparatus for producing a coated optical fiber constructed in accordance with a fourth embodiment of the invention.

Referring now to FIG. 5, there are shown a cooling assembly 4 and an He gas purifying and circulating means 10 of an apparatus for producing a coated optical fiber constructed in accordance with a fourth embodiment of the invention. In the same manner as the prior art of FIG. 7, the cooling assembly 4 on its upstream side is connected to the drawing furnace 2 and on its downstream side is connected to the resin coating means 5.

The He gas purifying and circulating means 10 constructed in accordance with the fourth embodiment is constructed in accordance with a modification of combination of the first and third embodiments and the cooling assembly 4 may have two gas inlets 4b and 4b' provided on the lower side thereof in the same manner as in the third embodiment. The gas inlet 4b may be one to which the recovery gas of He is supplied while the gas inlet 4b' may be one to which the pure He gas is supplied. Although, in the illustrated embodiment, the gas inlets 4b and 4b' are disposed on upper and lower sides of the cooling assembly 4, respectively, it will be understood that they may be reversely disposed on lower and upper sides thereof, respectively.

The He gas purifying and circulating means 10 constructed in accordance with the fourth embodiment comprises the third reservoir 30 connected downstream of the gas purifier 29 and the second gas return passage 32 connected between the third reservoir 30 and the first reservoir 21 and having the pressure regulator 31 provided thereon, in the same manner as in the first embodiment. The pressure sensor 33 may be provided on the third reservoir 30 to detect the inner pressure of the third reservoir 30 and supply the inner pressure detection signal to the control means 42.

This gas purifying and circulating means 10 further comprises a recovery gas compressor 60 connected downstream of the third reservoir 30 to compress the recovery gas of He. The recovery gas compressor 50 may be intermittently driven while controlled by a drive instruction from the control means 42 so that the inner pressure of the third reservoir 30 is prevented from becoming negative.

A plurality of recovery gas storage reservoirs may be connected downstream of the recovery gas compressor 50 in the manner similar to the third embodiment.

More particularly, the first and second recovery gas storage reservoirs 48a and 48b to by turns store the recovery gas through the first and second storage control magnetic valves 47a and 47b, respectively, are connected in parallel to the recovery gas compressor 50 on its downstream side.

On the first and second recovery gas storage reservoirs 48a and 48b are provided the respective first and second pressure gauges 49a and 49b, which are in turn connected to the control means 42 so that the pressure signals from the respective pressure gauges 49a and 49b are input to the control means 42.

The first and second recovery gas storage reservoirs 48a and 48b are connected through the first and second recovery gas supply passages 36a and 36b to the gas inlet 4b of the cooling assembly 4. When the first and second recovery gas storage reservoirs 48a and 48b terminate to store the recovery gas of He, the recovery gas of He is supplied from the first or second recovery gas storage reservoir 48a or 48b through the first or second recovery supply passage 36a or 36b to the cooling assembly 4.

The first and second supply control magnetic valves 34a and 34b and the first and second MFCs 35a and 35b are provided on the first and second recovery gas supply passages 36a and 36b, respectively. The control means 42 supplies the flow rate control signals to the first and second MFCs 35a and 35b, respectively.

The pure He gas supply passage 37 having the MFC 38 provided thereon may be connected to the gas inlet 4b' of the cooling assembly 4 and the pure He gas is supplied through the gas supply passage 37 to the cooling assembly 4.

(OPERATION OF THE FOURTH EMBODIMENT)

In operation of the apparatus constructed in accordance with the fourth embodiment, the gas purifier 29 separates and recovers the He gas from the compressed gas mixture in the same manner as in the operation of the apparatus of the first embodiment.

The recovery gas of He stored by the third reservoir 30 is compressed by the recovery gas compressor 50. The inner pressure detection signal detected by the pressure sensor 33 for the third reservoir 30 is supplied to the control means 42. The control means 42 controls the operation of the recovery gas compressor 50 to intermittently drive it so that the inner pressure of the third reservoir 30 is never made negative.

The recovery gas of He compressed by the recovery gas compressor 50 is alternately stored by the first and second recovery gas storage reservoirs 48a and 48b through the first and second storage control magnetic valves 47a and 47b which are alternately opened in accordance with the instruction from the control means 42. For example, in case the first, recovery gas storage reservoir 48a fully stores the recovery gas of He, the control means 42 instructs the first storage control magnetic valve 47a to be closed and the second storage control magnetic valve 47b to be opened and therefore the compressed recovery gas of He is stored by the second recovery gas storage reservoir 48b.

Meanwhile, the first recovery gas storage reservoir 48a which has the recovery gas of He fully stored supplies the recovery gas of He to the gas inlet 4b of the cooling assembly 4 through the first recovery gas supply passage 36a having the first supply control magnetic valve 34a now opened in accordance with the instruction signal from the control means 42. Meantime, the recovery gas is stored by the second recovery gas storage reservoir 48b until it has the recovery gas of He fully stored.

The flow rate of the recovery gas of He is controlled by the instruction signal supplied from the control means 42 to the first MFC 35a so that the flow rate of the recovery gas of He predetermined in accordance with the line speed of the optical fiber is obtained.

As the pressure detection signal indicating that the gas pressure within the first recovery gas storage reservoir 48a to which the recovery gas of He is supplied is less than the predetermined value is supplied from the the first pressure gauge 49a to the control means 42, the control means 42 now controls the first supply control magnetic valve 34a to be closed and the second supply control magnetic valve 34b to be opened. Accordingly, the compressed recovery gas of He is now supplied from the second recovery gas storage reservoir 48b through the second recovery gas supply passage 36b to the gas inlet 4b of the cooling assembly 4. Meantime, the recovery gas of He is stored by the first recovery gas storage reservoir 48a from the recovery gas compressor 50 through the now opened storage control magnetic valve 47a.

The flow rate of the recovery gas of He is also controlled by the instruction fed from the control means 42 to the second MFC 35b so that the flow rate of the recovery gas of He predetermined in accordance with the line speed of the optical fiber 3.

In this manner, the recovery gas of He is alternately supplied from the first and second recovery gas storage reservoirs 48a and 48b to the cooling assembly 4 and the operation is repeated so that the recovery gas of He is continuously supplied to the cooling assembly 4.

(ADVANTAGES OF THE FOURTH EMBODIMENT)

One of advantages of the apparatus constructed in accordance with the fourth embodiment is that the recovery gas storage reservoirs 48a and 48b of smaller capacity can store the larger quantity of the recovery gas than those of the third embodiment because the recovery gas from the third reservoir 30 compressed by the recovery gas compressor 50 is once stored by the recovery gas storage reservoirs 48a and 48b.

Another advantage is that the cooling assembly 4 is never adversely affected by the variation in the pressure of the recovery gas compressor 50 because the recovery gas compressed by the recovery gas compressor 50 is supplied to the cooling assembly 4 after it is once stored by the recovery gas storage reservoirs 48a and 48b, which is substantially identical to the advantage of the third embodiment.

Further advantage is that the recovery gas of He having a stable pressure can be supplied to the cooling assembly 4 because the recovery gas of He is supplied from one of the recovery gas storage reservoirs 48a and 48b which has the recovery gas of He fully stored and when the gas pressure within the supplying recovery gas storage reservoir 48a or 48b becomes lower than the predetermined value, the recovery gas of He is switched to be supplied from another recovery gas storage reservoir 48b or 48a in the manner similar to the recovery gas of He of the third embodiment. As aforementioned, since the flow rate of the recovery gas of He is controlled by the MFCs 35a and 35b and also the recovery gas of He is switched to be supplied from one of the recovery gas storage reservoirs to another recovery gas storage reservoir, the recovery gas of He can be more stably supplied to the cooling assembly 4. This accomplishes the same effects as obtained when only the He gas is supplied to the cooling assembly 4.

(ACCURACY OF COAT DIAMETER OF THE COATED OPTICAL FIBER)

In case the optical fiber 3 passes through the cooling assembly 4 at the line speed of 1000 m/minute, the coat diameter of the coated optical fiber 7 produced by the prior art apparatus varies within a range of ±3 μmm while the coat diameter of the coated optical fiber 7 produced by the apparatus of FIG. 5 varies within a range of ±2 μmm. It will be noted from this that the apparatus of FIG. 5 can more effectively prevent the coat diameter of the coated optical fiber 7 from varying than that of the prior art.

(CONSTRUCTION OF THE FIFTH EMBODIMENT)

Figure 6:
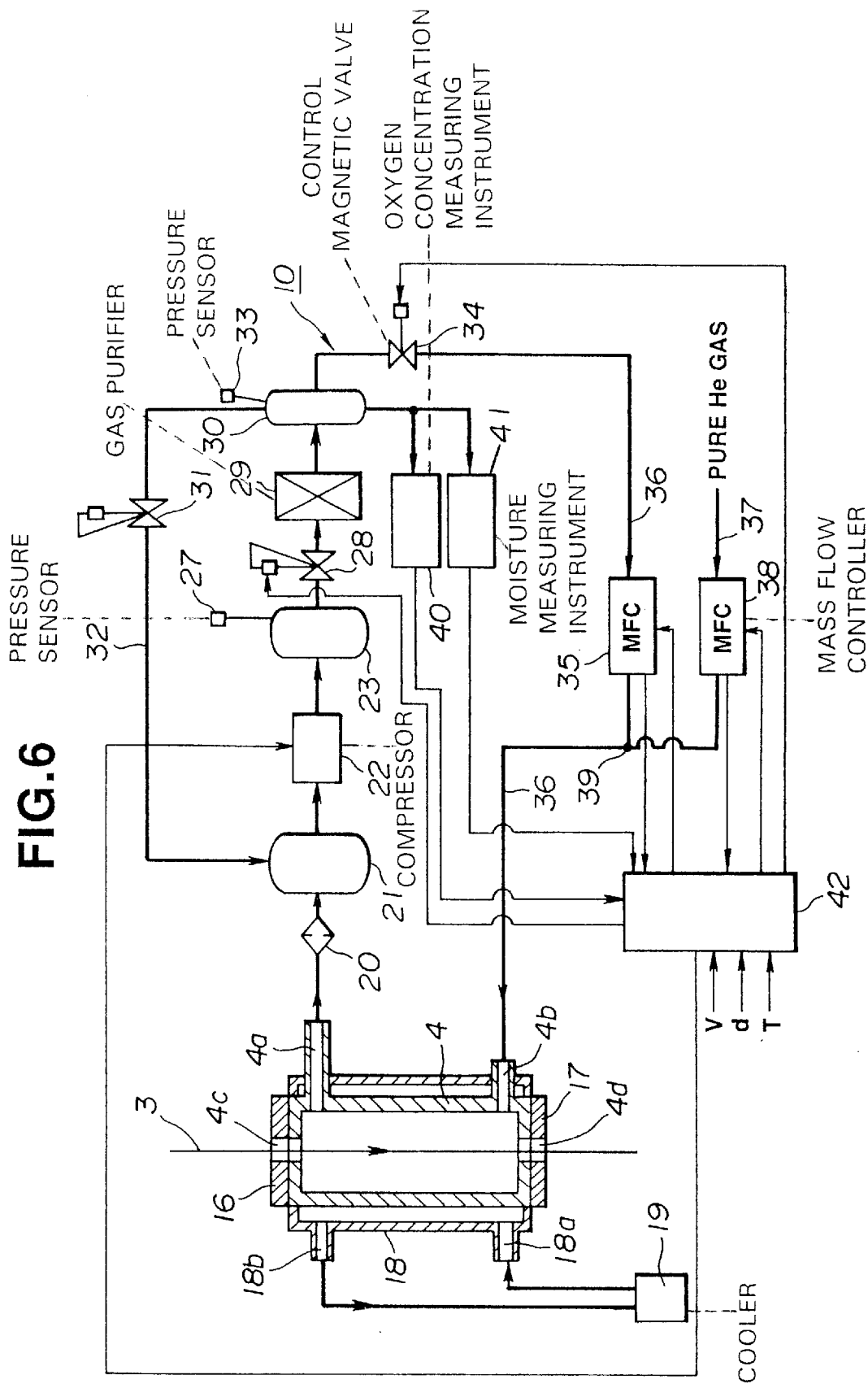
FIG. 6 is a schematic diagram of an He gas purifying and circulating means of an apparatus for producing a coated optical fiber constructed in accordance with a fifth embodiment of the invention.

Referring now to FIG. 6, there are shown a cooling assembly 4 and an He gas purifying and circulating means 10 of an apparatus for producing a coated optical fiber constructed in accordance with a fifth embodiment of the invention. In the same manner as the prior art of FIG. 7, the cooling assembly 4 on its upstream side is connected to the drawing furnace 2 and on its downstream side is connected to the resin coating means 5.

The He gas purifying and circulating means 10 constructed in accordance with the fifth embodiment is substantially identical to the He gas purifying and circulating means 10 of the first embodiment except that the first gas return passage 25 and the pressure regulator 24 of the first embodiment are omitted. Accordingly, only the construction different from that of the first embodiment will be described hereinjustbelow.

In the gas purifying and circulating means 10 of the fifth embodiment, the compressor 22 may be of suction variable compressor having a revolution variable rotary shaft provided therein and be driven in accordance with a revolution control signal for the compressor 22 from the control means 42 which receives the supply flow rate signals from the MFCs 35 and 38 so that the gas mixture is sucked out of the cooling assembly 4 while having the flow rate of suction proportional to the flow rate of the cooling gas supplied to the cooling assembly 4.

(OPERATION OF THE FIFTH EMBODIMENT)

In operation of the apparatus constructed in accordance with the fifth embodiment, although the compressor 22 sucks the gas mixture out of the gas outlet 4a of the cooling assembly 4 through the first reservoir 21 as in the same manner as the compressor 22 of the first embodiment, the compressor 22 is operated in a manner similar to one of the first embodiment except that it is controlled as described hereinjustbelow.

The recovery gas having the flow rate set by the MFC 35 is supplied from the third reservoir 30 through the supply control magnetic valve 34 to the gas inlet 4b of the cooling assembly 4 while the pure He gas having the flow rate set by the MFC 38 is supplied to the gas inlet 4b of the cooling assembly 4. The control means 42 supplies the revolution control signal to the compressor 22 so that the gas mixture having the flow rate of suction proportional to the predetermined total of the flow rate of the recovery gas of He and that of the pure He gas is sucked from the cooling assembly 4 by the compressor 22. Thus, since the flow rate of the cooling gas supplied to the cooling assembly 4 is equal to the flow rate of the gas mixture sucked out of the cooling assembly 4, the cooling assembly 4 is restrained from having excessive negative pressure applied thereto due to the operation of the compressor 22. This prevents the He gas concentration of the gas mixture sucked by the compressor 22 from being lowered and therefore the efficiency of separation of He gas by the gas purifier 29 from being lowered.

Since the rest of operation of the apparatus constructed in accordance with the fifth embodiment is substantially identical to that of the first embodiment, its description will be omitted.

(ADVANTAGES OF THE FIFTH EMBODIMENT)

Since the gas purifying and circulating means 10 according to the fifth embodiment is not required to have the first gas return passage 25 and the pressure regulator 24 on the first gas return passage 25 of the first embodiment, which are required for preventing the cooling assembly 4 of FIG. 1 from having the excessive negative pressure applied thereto, the entire equipment can be advantageously more compacted that that of the first embodiment. On the other hand, The cost of the equipment will be disadvantageously higher because of the compressor 22 being specially ordered and prepared.

Since the flow rate of the cooling gas supplied to the cooling assembly 4 is equal to the flow rate of the gas mixture sucked out of the cooling assembly 4, there is not required the troublesome control for adjusting the return gas pressure in the gas return passage 25, which causes the control of the fifth embodiment to be more advantageously made than that of the first embodiment.

Although some preferred embodiments of the invention have been described and illustrated with reference to the accompanying drawings, it will be understood by those skilled in the art that they are by way of examples and that various changes and modifications might be made without departing from the spirit and scope of the invention. For example, although the pressure regulator 24 of FIG. 1 has the pressure adjusted based on the upstream pressure signal detected by the pressure sensor 26 for detecting the pressure on the side of the gas outlet 4a of the cooling assembly 4, there may be provided a laminar flow meter to detect the flow rate of the gas mixture sucked out of the gas outlet 4a of the cooling assembly 4 and the pressure of the regulator 24 may be adjusted based on the flow rate of the gas mixture detected by the laminar flow meter. The pressure regulator 24 may be so controlled that a total (T1) of the flow rate of supply through the MFCs 35 and 38 provided upstream of the gas inlet 4b of the cooling assembly 4 is equal to a total (T2) of the flow rate of supply through the MFC 35 and the flow rate of exhaust of the drain gas through the MFC 45 (see FIG. 3) provided on the side of the outlet of the gas purifier 29 and the flow quantity of suction.

It will be understood by those skilled in the art that the embodiment of FIG. 6 might be modified in the same manner as the second and third embodiments which are modifications of the first embodiment.

It should be noted that the invention is defined only to the appended claims.

What is claimed is:

1. An apparatus for producing a coated optical fiber comprising a cooling assembly containing ambient air in which He gas is discharged for cooling an optical fiber passed therethrough following drawing, heating and spinning of the fiber; a resin coating means to coat a resin around said optical fiber after it is cooled down to a predetermined temperature by passing through said cooling assembly; a gas purifying and circulating means to retrieve, by suction, a gas mixture including said He gas from said cooling assembly and separate a recovery gas enriched in He from said gas mixture, thereby recycling said He gas; and a pure He gas supply means to supply a substantially pure He gas to said cooling assembly, said gas purifying and circulating means comprising a compressor to withdraw by suction and compress a flow of said gas mixture withdrawn from said cooling assembly; a suction control means to control pressure within said cooling assembly by controlling the flow of said gas mixture withdrawn from said cooling assembly; a gas purifier to separate and purify He gas to form said recovery gas from said gas mixture and a recovery gas supply passage to supply said recovery gas from said gas purifier to said cooling assembly, said gas purifying and circulating means further including a He gas concentration annunciator to derive a He gas concentration of said recovery gas, a recovery gas mass flow controller to control a flow rate of said recovery gas supplied to said cooling assembly, a pure He gas mass flow controller to control a flow rate of said pure He gas supplied to said cooling assembly, and control means to control said mass flow controllers and said flow rates of said recovery gas and pure He gas to said cooling assembly.

2. An apparatus for producing a coated optical fiber comprising a cooling assembly containing ambient air in which He gas is discharged for cooling an optical fiber passed therethrough after drawing, heating and spinning of the fiber; a resin coating means to coat a resin around said optical fiber after it is cooled down to a predetermined temperature by passing through said cooling assembly; a gas purifying and circulating means to retrieve a gas mixture including said He gas and possible ambient air in said cooling assembly and separate a recovery gas enriched in He from said gas mixture, thereby recycling said He gas; and a pure He gas supply means to supply a pure He gas to said cooling assembly, said gas purifying and circulating means comprising a first reservoir to store said gas mixture retrieved from said cooling assembly; a compressor to withdraw and compress said gas mixture from said first reservoir; a second reservoir to store said gas mixture compressed by said compressor; a first gas return passage to return part of said compressed gas mixture from said second reservoir to said first reservoir; a gas purifier to separate and purify He gas to form said recovery gas from said compressed gas mixture and a recovery gas supply passage to supply said recovery gas from said gas purifier to said cooling assembly, said gas purifying and circulating means further including a He gas concentration annunciator to derive a He gas concentration of said recovery gas, a recovery gas mass flow controller to control a flow rate of said recovery gas supplied to said cooling assembly, a pure He gas mass flow controller to control a flow rate of said pure He gas supplied to said cooling assembly, and control means to control said mass flow controllers and said flow rates of said recovery gas and pure He gas to said cooling assembly.

3. An apparatus for producing a coated optical fiber as set forth in claim 2 and wherein said optical fiber passes through said cooling assembly at a fiber line speed, said resin coating means coats said resin around said fiber at a coating diameter, and said control means controls said flow rates of said recovery gas and pure He gas to said cooling assembly in proportion to at least one of said fiber line speed, said coating diameter and said He gas concentration of said recovery gas.

4. An apparatus for producing a coated optical fiber as set forth in claim 2 and wherein said gas purifier also forms a drain gas from said compressed gas mixture, said gas purifying and circulating means further comprises a drain gas mass flow controller to control a flow of said drain gas in proportion with said He gas concentration derived by said He gas concentration annunciator.

5. An apparatus for producing a coated optical fiber comprising a cooling assembly containing ambient air in which He gas is discharged for cooling an optical fiber passed therethrough following drawing, heating and spinning of the fiber; a resin coating means to coat a resin around said optical fiber cooled down to a predetermined temperature through said cooling assembly; a gas purifying and circulating means to retrieve a gas mixture including said He gas and possible ambient air from said cooling assembly and separate a recovery gas enriched in He from said gas mixture, thereby recycling said He gas; and a pure He gas supply means to supply a substantially pure He gas to said cooling assembly; said gas purifying and circulating means comprising a first reservoir to store said gas mixture retrieved from said cooling assembly; a compressor to compress said gas mixture supplied from said first reservoir; a second reservoir to store said gas mixture compressed by said compressor; a first gas return passage to return to said first reservoir part of said compressed gas mixture within said second reservoir; said gas purifying and circulating means including a gas purifier to separate and purify said He gas to form said recovery gas from said compressed gas mixture from said second reservoir; a third reservoir to store said recovery gas recovered by said gas purifier; a second gas return passage to return to said first reservoir a part of said recovery gas within said third reservoir; a He gas concentration annunciator to derive a He gas concentration of said recovery gas and a recovery gas supply passage to supply said recovery gas stored by said third reservoir to said cooling assembly, said gas purifying and circulating means further including a recovery gas mass flow controller to control a flow rate of said recovery gas supplied to said cooling assembly, a pure He gas mass flow controller to control a flow rate of said pure He gas supplied to said cooling assembly, and control means to control said mass flow controllers and said flow rates of said recovery gas and sure He gas to said cooling assembly.

6. An apparatus for producing a coated optical fiber as set forth in claim 5 and wherein said optical fiber passes through said cooling assembly at a fiber line speed, said resin coating means coats said resin around said fiber at a coating diameter, and said control means controls said flow rates of said recovery gas and pure He gas to said cooling assembly in proportion to at least one of said fiber line speed, and said coating diameter and said He gas concentration of said recovery gas.

7. An apparatus for producing a coated optical fiber as set forth in claim 5, wherein said gas purifier also forms a drain gas from said compressed gas mixture, said gas purifying and circulating means further comprise a drain gas flow controller to control a flow of said drain gas in proportion with said He gas concentration derived by said He gas concentration annunciator.

8. An apparatus for producing a coated optical fiber comprising a cooling assembly containing ambient air in which He gas is discharged for cooling an optical fiber passed therethrough following drawing, heating and spinning of the fiber; a resin coating means to coat a resin around said optical fiber after it is cooled down to a predetermined temperature by passing through said cooling assembly; a gas purifying and circulating means to retrieve a gas mixture including He gas and possible ambient air from said cooling assembly and separate a recovery gas of He from said gas mixture, thereby recycling said He gas and a pure gas supply means to supply a substantially pure He gas to said cooling assembly, said gas purifying and circulating means comprising a first reservoir to store said retrieved gas mixture; a compressor to compress gas mixture supplied from said first reservoir; a control to control an operation of said compressor so that said gas mixture is withdrawn in proportion to a flow rate of said He gas supplied to said cooling assembly; a second reservoir to store said gas mixture compressed by said compressor; a gas purifier to separate and concentrate He gas to form said recovery gas of He from said compressed gas mixture supplied from said second reservoir, and a recovery gas supply passage to supply said recovery gas from said gas purifier to said cooling assembly, said gas purifying and circulating means further including a He gas concentration annunciator to derive a He gas concentration of said recovery gas, a recovery gas mass flow controller to control a flow rate of said recovery gas supplied to said cooling assembly, a pure He gas mass flow controller to control a flow rate of said pure He gas supplied to said cooling assembly, and control means to control said mass flow controllers and said flow rates of said recovery gas and pure He gas to said cooling assembly.

9. An apparatus for producing a coated optical fiber comprising a cooling assembly containing ambient air and in which He gas is discharged for cooling an optical fiber passed therethrough following drawing, heating and spinning of the fiber, said cooling assembly being maintained at a desired operating pressure to inhibit entry of additional ambient air; a resin coating means to coat a resin around said optical fiber after it is cooled to a predetermined temperature upon passing through said cooling assembly; a gas purifying and circulating means to withdraw a gas mixture including said He gas from said cooling assembly and to separate a recovery gas including He from said gas mixture; and a pure He gas supply means to supply substantially pure He gas to said cooling assembly, said gas purifying and circulating means comprising a compressor and a means cooperating to withdraw a flow of said gas mixture from said cooling assembly while maintaining said desired operating pressure and to compress said withdrawn gas mixture; said compressor and control means maintaining said desired operating pressure by controlling the flow of said gas mixture withdrawn from said cooling assembly; a gas purifier to separate and purify said He gas to form said recovery gas from said gas mixture compressed by said compressor and a recovery gas supply passage to supply said recovery gas from said gas purifying and circulating means to said cooling assembly, said gas purifying and circulating means further including a He gas concentration annunciator to derive a He gas concentration of said recovery gas, a recovery gas mass flow controller to control a flow rate of said recovery gas supplied to said cooling assembly, and a pure He gas mass flow controller to control a flow rate of said Pure He gas supplied to said cooling assembly, said control means controlling said mass flow controllers and said flow rates of said recovery gas and pure He gas to said cooling assembly.

10. An apparatus for producing a coated optical fiber as set forth in claim 9, wherein said optical fiber passes through said cooling assembly at a fiber line speed, said resin coating means coats said resin around said fiber at a coating diameter, and said control means controls said flow rates of said recovery gas and pure He gas to said cooling assembly in proportion to at least one of said fiber line speed, said coating diameter and said He gas concentration of said recovery gas.

11. An apparatus for producing a coated optical fiber as set forth in claim 10, wherein said gas purifying and circulating means comprise first and second reservoirs respectively located upstream and downstream of said compressor for storing gas mixture withdrawn from said cooling assembly by said compressor and gas mixture compressed by said compressor, a first gas return passage to return part of the compressed gas mixture within said second reservoir to said first reservoir, and said control means vary the flow of said gas mixture withdrawn from said cooling assembly by modulating the gas flow in said gas return passage.

12. An apparatus for producing a coated optical fiber as set forth in claim 9, wherein said fiber passes through said apparatus at a line speed during production of said coated optical fiber, said resin is coated around said fiber with a coated diameter, and control means monitor at least one of the line speed of said fiber, the diameter of the resin coat around said fiber, and the concentration of He in said recovery gas.

* * * * *